US012664671B2

(12) United States Patent
Hemmer

(10) Patent No.: US 12,664,671 B2
(45) Date of Patent: Jun. 23, 2026

(54) IDENTIFYING DUPLICATE OBJECTS USING CANONICAL FORMS IN CONTENT CREATION SYSTEMS AND APPLICATIONS

(71) Applicant: Nvidia Corporation, Santa Clara, CA (US)

(72) Inventor: Michael Hemmer, Saarbruecken (DE)

(73) Assignee: Nvidia Corporation, Santa Clara, CA (US)

(*) Notice: Subject to any disclaimer, the term of this patent is extended or adjusted under 35 U.S.C. 154(b) by 106 days.

(21) Appl. No.: 18/477,651

(22) Filed: Sep. 29, 2023

(65) Prior Publication Data

US 2024/0119612 A1 Apr. 11, 2024

Related U.S. Application Data

(60) Provisional application No. 63/413,582, filed on Oct. 5, 2022.

(51) Int. Cl.
*G06T 7/50* (2017.01)
*G06T 17/00* (2006.01)
*G06T 19/20* (2011.01)

(52) U.S. Cl.
CPC .............. *G06T 7/50* (2017.01); *G06T 17/00* (2013.01); *G06T 19/20* (2013.01); *G06T 2219/2016* (2013.01)

(58) Field of Classification Search
CPC G06T 7/50; G06T 17/00; G06T 19/20; G06T 2219/2016
See application file for complete search history.

(56) References Cited

U.S. PATENT DOCUMENTS 9,177,256 B2 * 11/2015 Wunderling ............ G06F 17/11
11,995,557 B2 * 5/2024 Stojevic ................ G16B 40/30

OTHER PUBLICATIONS

Gilbert Strang, Introduction to Linear Algebra (Lecture 28: Similar matrices and Jordan form—https://ocw.mit.edu/courses/18-06sc-linear-algebra-fall-2011/6e1f793f6c25fd39e002c100e278bf1b_MIT18_06SCF11_Ses3.4sum.pdf), 2011, MIT, pp. 1-5. (Year: 2011).*

* cited by examiner

*Primary Examiner* — Cheng Yuan Tseng
(74) *Attorney, Agent, or Firm* — Hogan Lovells US LLP

(57) ABSTRACT

Approaches presented herein provide systems and methods for determining duplicate objects within an interaction environment. Connectivity information for an object may be used to map a set of three linearly independent vectors corresponding to a transform applied to the object. These three linearly independent vectors may be used to form canonical forms of first and second objects to determine whether the first object and the second object are duplicates or near-duplicates. Copies of duplicate or near-duplicate objects may then be deleted from the interaction environment and represented by a common object to which one or more additional transforms are applied.

22 Claims, 19 Drawing Sheets

DATA CENTER
800

APPLICATION LAYER 840

APPLICATION(S) 842

SOFTWARE LAYER 830

SOFTWARE 832

FRAMEWORK LAYER 820

JOB SCHEDULER 822  ←  CONFIGURATION MANAGER 824

DISTRIBUTED FILE SYSTEM 828

RESOURCE MANAGER 826

DATA CENTER INFRASTRUCTURE LAYER 810

RESOURCE ORCHESTRATOR 812

GROUPED COMPUTING RESOURCES 814
715

NODE C.R. 816(1)    NODE C.R. 816(2)   ● ● ●   NODE C.R. 816(N)
715                 715                        715

IDENTIFYING DUPLICATE OBJECTS USING CANONICAL FORMS IN CONTENT CREATION SYSTEMS AND APPLICATIONS

CROSS-REFERENCE TO RELATED APPLICATIONS

This application claims priority to and the benefit of U.S. Provisional Patent Application No. 63/413,582, filed Oct. 5, 2022, titled "DATA ADAPTER DE-DUPLICATION," the full disclosure of which is hereby incorporated in its entirety for all purposes.

BACKGROUND

Universal Scene Description (USD) is a file format used for describing a scene, such as scenes within collaborative environments where multiple users can interact with three-dimensional (3D) and two-dimensional (2D) content. The USD file format can include information for data objects for rendering and display within the environment, which may allow users to edit, manipulate, or otherwise interact with the data objects. The data objects may be generated by a variety of different parent applications, with different file types, that are collected and then merged within the environment. Information for the data objects may include geometry information, textures, colors, and various other data that may be used by either the parent application or the interaction environment. The scene descriptions may be very hard and difficult to handle or to keep in memory. As scenes within environments expand to include more objects and greater complexity, the size of USD files may become unwieldy. This is especially true in instances where a single object is replicated multiple times within the environment.

BRIEF DESCRIPTION OF THE DRAWINGS

Various embodiments in accordance with the present disclosure will be described with reference to the drawings, in which.

DETAILED DESCRIPTION

Figure 1:
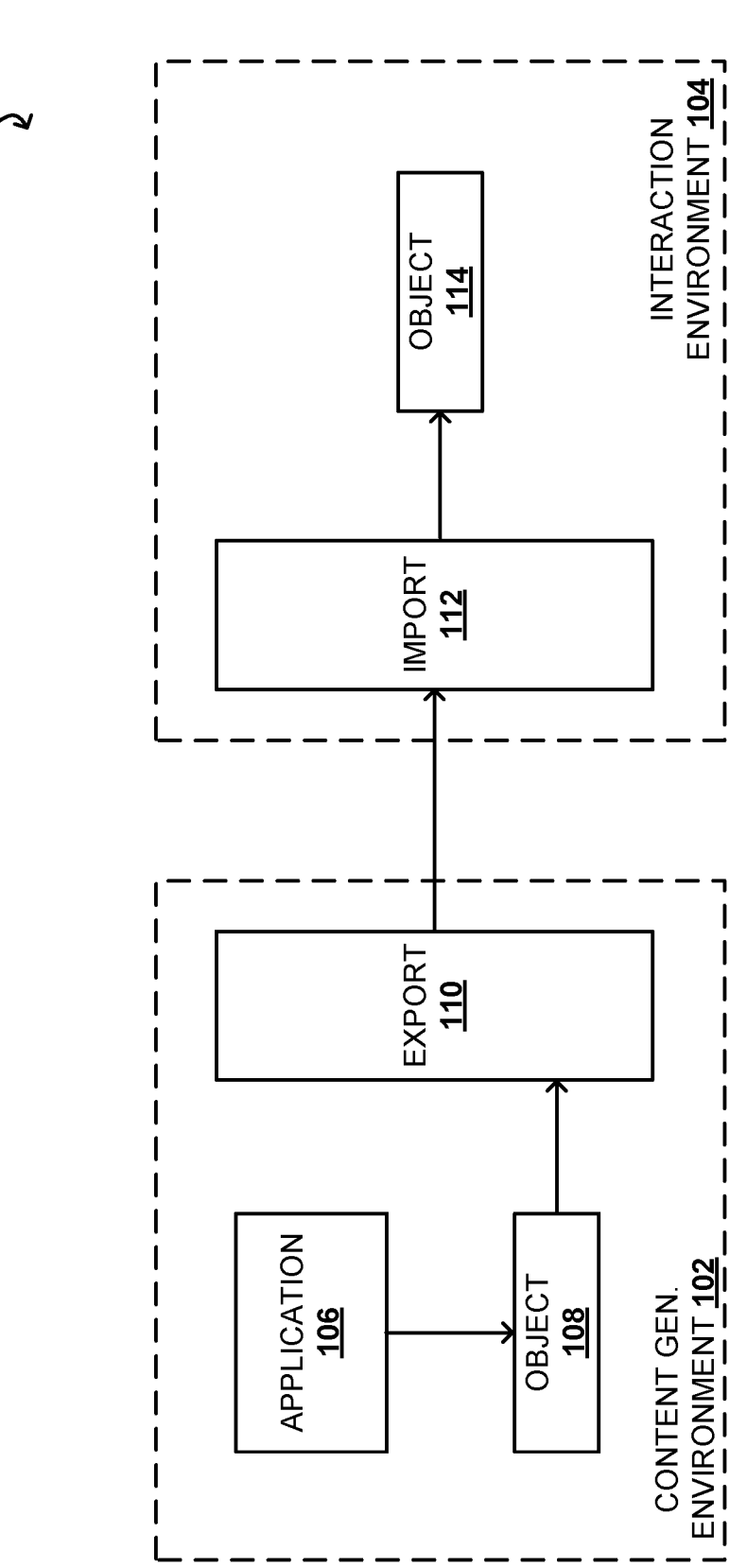
FIG. 1 illustrates an example environment for important objects into an interaction environment, in accordance with various embodiments.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

The systems and methods described herein may be used by, without limitation, non-autonomous vehicles or machines, semi-autonomous vehicles or machines (e.g., in an in-cabin infotainment or digital or driver virtual assistant application)), autonomous vehicles or machines, piloted and un-piloted robots or robotic platforms, warehouse vehicles, off-road vehicles, vehicles coupled to one or more trailers, flying vessels, boats, shuttles, emergency response vehicles, motorcycles, electric or motorized bicycles, aircraft, construction vehicles, trains, underwater craft, remotely operated vehicles such as drones, and/or other vehicle types. Further, the systems and methods described herein may be used for a variety of purposes, by way of example and without limitation, for machine control, machine locomotion, machine driving, synthetic data generation, model training or updating, perception, augmented reality, virtual reality, mixed reality, robotics, security and surveillance, simulation and digital twinning, autonomous or semi-autonomous machine applications, deep learning, environment simulation, object or actor simulation and/or digital twinning, data center processing, conversational artificial intelligence (AI), generative AI with large language models (LLMs), light transport simulation (e.g., ray-tracing, path tracing, etc.), collaborative content creation for 3D assets, cloud computing and/or any other suitable applications.

Disclosed embodiments may be comprised in a variety of different systems such as automotive systems (e.g., a control system for an autonomous or semi-autonomous machine, a perception system for an autonomous or semi-autonomous machine), systems implemented using a robot, aerial systems, medial systems, boating systems, smart area monitoring systems, systems for performing deep learning operations, systems for performing simulation operations, systems for performing digital twin operations, systems implemented using an edge device, systems incorporating one or more virtual machines (VMs), systems for performing synthetic data generation operations, systems implemented at least partially in a data center, systems for performing conversational AI operations, systems for performing generative AI operations using LLMs, systems for performing light transport simulation, systems for performing collaborative content creation for 3D assets, systems implemented at least partially using cloud computing resources, and/or other types of systems.

Approaches in accordance with various embodiments can be used to identify duplicate (or near-duplicate) objects within an interaction environment. Various embodiments may identify copies (e.g., duplicate data objects having features within a threshold of one another) placed within a scene at various difference places. By way of example, an efficiently designed scene may include copies of an object, such as a chair, that is positioned around a table multiple times. For efficiency, the chair (e.g., an object file associated with the chair) should only be stored once and then copied/duplicated at the various different positions, such as by using a matrix for each chair to define the chair's position within the scene. The duplication may save resources and costs associated with network traffic, disk space, memory, and/or the like. In contrast, an inefficient design for the scene representation would individually define/load each chair separately for each position of the chair within the scene. As a result, additional memory and resources would be used. For scenes with multiple duplicate objects, such as an industrial scene with thousands of fasteners or a stadium with thousands of chairs, scaling may be difficult. Various embodiments may include data objects that are generated by a non-native application, which may include one or more exporters to prepare the data objects for use with the environment. Returning to the example with the chairs, during export, to place the chairs within the scene at their desired locations, the chairs may undergo a deep transform. Moreover, each deep transform may be different for each chair. As a result, the point coordinates for each copy will differ entirely. Systems and methods may address the problems associated with objects that have been manipulated or otherwise modified by deep transforms in which point coordinates of duplicate or near-duplicates objects are different due to exporting.

For example, an object may correspond to a three-dimensional (3D) object generated using one or more applications. In at least one embodiment, the 3D object may include a representation of an object using, for example, a mesh-based approach in which a mesh (e.g., a polygon mesh, a triangular mesh, etc.) may be formed by a collection of vertices, edges, and faces to define a shape for a polyhedral object. Additionally, various embodiments may also extend to other object representations, including but not limited to, non-uniform rational basis spline (NURBS), Bezier patches, subdivision surfaces, and/or the like. As described herein, each of these representations may share one or more features that enables use of the systems of the methods of the present disclosure. For example, a polygon mesh includes vertices, edges, and faces to represent an object and a subdivision surface is also represented by a polygon mesh produced by a recursive algorithmic method. Similarly, NURBS may include generalized surfaces and control points to form control polygons representative of a mesh. Furthermore, Bezier surfaces are defined by a set of control points where the surface is positioned between the control points to form patch meshes. As a result, due to several overlapping features and/or components, systems and methods of the present disclosure may be extended toward a variety of different object representations, such as 3D object representations. The object may be provided for use within an interaction environment. If the exporter (e.g., the exporter associated with the native application in which the object(s) were created) would leave the points of a mesh unchanged and provide one or more transforms to place an object in the scene, then meshes of duplicates would be identical (e.g., the same or within a threshold distance of one another). Instead, one or more exporters apply those transforms to the points of the mesh. In other words, when the object is exported from the native parent application, one or more transforms may be applied to the object at a point-level. Because of the deep transforms, a duplicate (or near-duplicate) object may have coordinates that differ, such as due to rounding errors, with an apparent duplicate, and therefore hash values between the two objects cannot be used for de-duplication. In certain instances, the coordinates of the points may be significantly different. Returning to the examples of the chairs, six chairs around a table, even if the chairs are the "same," would have different coordinates due to their different coordinate positions within the scene. Accordingly, the objects may be separately stored, thereby increasing a size of the Universal Scene Description (USD) file, occupying larger storage space, and potentially causing a slower or more latency-prone experience for a user. Furthermore, existing methods also provide problems with bandwidth use and lost time when transferring data, along with use of graphics processing unit (GPU) memory due to the additional data for each undetected duplicate within the scene. Such problems may be exacerbated and become particularly unwieldy with very large scenes, such as a factory, where without de-duplication every copy of a screw or fastener may occupy additional GPU memory. However, with de-duplication, the screws, fasteners, and the like may be stored only once (or at least with fewer copies than a number of objects within the scene). Thus, with de-duplication the GPU memory usage of the scene may be essentially reduced to the number of unique meshes that occur in the scene. Thus, a de-duplicated scene may be able to fit on one GPU, while a scene that includes duplicates may need an entire server farm. Systems and methods of the present disclosure overcome these challenges by determining canonical meshes for mapping objects after undergoing deep transforms. As a result, duplicate and/or near-duplicate objects can be identified and removed to only store a threshold number of objects (such as only one copy). The single copy may then be replicated throughout the environment by applying one or more additional transforms to modify the object position in 3D space.

Various embodiments are directed toward receiving an object from a native source application within an interaction environment and identifying at least three linearly independent vectors from a selected origin point. In at least one embodiment, the three linearly independent vectors may not be positioned perpendicular to one another (e.g., vector A may not be perpendicular to vector B and vector B may not be perpendicular to vector C). In certain embodiments, the three linearly independent vectors may be positioned perpendicular to one another (e.g., a vector A is perpendicular to a vector B which is perpendicular to a vector C). The three linearly independent vectors may be assigned as x-y-z coordinates for the object and the points forming the three vectors. Then, when comparing another object to determine whether the other object is a duplicate or near-duplicate, the x-y-z coordinates may be mapped to the same points for the other object. If the x-y-z coordinate maps to the other object, within a threshold, then the objects may be considered duplicates or near-duplications, and therefore, only one copy may be saved to represent both objects. By identifying the duplicates and/or near-duplicates, resources may be conserved. Furthermore, converting object meshes to their canonical forms provides a structure for additional transforms or other modifications to be applied to the object within the interaction environment, thereby maintaining functionality of the environment. For example, additional transforms may be applied to modify an object position or orientation, which may include using one or more rigid transforms (e.g., a transforms where vectors are perpendicular and normalized to a length of 1).

Various other such functions can be used as well within the scope of the various embodiments as would be apparent to one of ordinary skill in the art in light of the teachings and suggestions contained herein.

FIG. 1 illustrates an example environment 100 in which various aspects of the present disclosure can be performed. In this example, a content generation environment 102 may be used to create one or more content elements that may be used within an interaction environment 104. For example, an application 106 may be accessible to one or more users to generate one or more objects 108. The object 108 may correspond to a 3D object that includes features such as a geometric representation, textures, shading, colors, and/or the like. As noted, the object may be represented by a mesh or other representation, such as NURBS, Bezier patches, subdivision surfaces, and/or the like, as described herein. In at least one embodiment, the object 108 is generated within the native application 106 such that the object 108 is viewed from one or more perspectives or viewpoints. For example, the application 106 may include a coordinate system on which the object 108 is generated. Thereafter, different views, such as perspective views, side views, top views, and/or others may be associated with the object 108 to enable interaction with the object 108 from a variety of different angles. The object 108 may also be used within a larger representation, such as a representation that illustrates interaction between the object 108 and various other objects and/or to represent the object within an environment that may include different lighting characteristics or other features.

The object 108 may be saved having a certain file format, and as a result, different types of data may be stored with the object 108. For example, different file formats may include different metadata, different rendering instructions, and the like. In at least one embodiment, the object 108 may be loaded into the interaction environment 104 for further interaction and use. An exporter 110 may be used to format the object 108 and/or adjust one or more features of the object 108 to permit use within the interaction environment 104 and/or to capture information useful for reproduction within the interaction environment 104. An importer 112 may then receive the object 108 (which may be modified by one or more operations of the exporter 110) and format an object 114 for use within the interaction environment 104.

In at least one embodiment, the original object 108 is different, at least in some parts, from the object 114 in that one or more operations may be performed on the original object 108 that modifies certain aspects of the object 114. By way of example, one or more transforms may be applied to the object 108 via one or both of the exporter 110 and the importer 112. A transform may adjust an appearance or orientation of the object 108. For example, a transform may be used to change an orientation of the object 108 in 3D space such that a point, vertex, face, and/or the like is arranged at a different position. While the intended operation of various transforms is to place the object 108 within a scene, various content generation environments 102 instead apply the transforms to individual points, normals, faces, and the like of a mesh corresponding to the object 108. These types of transforms may be called "deep transforms" because they are "baked into" or otherwise become a part of the object 114. The specific deep transforms, however, are unknown to the importer 112 and/or the interaction environment 104. As a result, the object 108 may appear to be different from a duplicate object just because of how the different objects are arranged within the space.

As noted, deep transforms are applied to objects at a point level for a corresponding mesh or other structure. The transforms applied to the objects may not be known by the importer 112 when the objects are added to the interaction environment 104 because they may be applied by the content generation environment 102 itself or one or more components of the content generation environment 102, such as the exporter 110 or within the application 106. The transforms may correspond to one or more mathematical operations in which rounding errors are carried through at different locations, which may cause deformations of the object. These deformations may cause problems when trying to identify a number of duplicate or near-duplicate objects within a scene. For example, in an industrial setting, an object may be replicated tens or hundreds of times, such as with fasteners like bolts, nuts, screws, nails, and/or the like. Each fastener within a group of fasteners may be a duplicate and/or a near-duplicate of another (e.g., a ⅜ inch hex bolt with coarse thread type is essentially a duplicate of another ⅜ inch hex bolt with a coarse thread type, regardless of the orientation of the bolts). However, because of the transforms, the objects may not appear as duplicates. Additionally, traditional duplication identification methods are insufficient to identify these objects. For example, pairwise shape matching is insufficient to overcome these problems because the complexity of the algorithms used and the quadratic nature of pairwise comparison. In scenes with hundreds or thousands of potential duplicates, such methods would require too much time and the use of too many computational resources. Certain traditional hashing methods for duplicate identification are also insufficient because the transforms, and their associated deformations, modify and change the hash values of individual objects such that duplications are no longer identified using just the hash values. Systems and methods discussed herein address these problems by hashing only on connectivity data, which does not change, even with deformations applied via the various transforms. That is, various embodiments may still use hashing on the connectivity information of a mesh, as one example, because, as noted herein, the deep transforms modify the point coordinates and/or directional attributes, without modifying the connectivity information. Accordingly, connectivity and/or topology (e.g., vertices, edges, faces, etc.) of the meshes associated with various data objects will not change. In contrast, deep transforms will change the coordinates of the points various vertices are associated with, but on a topology level the object remains unchanged. Because each vertex remains connected to the same vertices as before, and moreover because the connectivity for edges and faces also remains the same, systems and methods may use that data for hashing. By leveraging hashing on the unchanging topology information, various embodiments significantly reduce the number of meshes that are compared by other means.

Various embodiments address the problems caused by deep transforms, such as increasing a size of the USD file with geometry of duplicate or near-duplicate objects. By replacing duplicate and near-duplicate geometries, systems and methods may reduce an amount of geometric data associated with a USD file. As a result, less data may need to be obtained from a drive, less data may be sent over a network, less data may be uploaded to a processor (such as a GPU), less data may occupy GPU memory, and/or less data may occupy ordinary system memory, such as random access memory (RAM).

Figure 2:
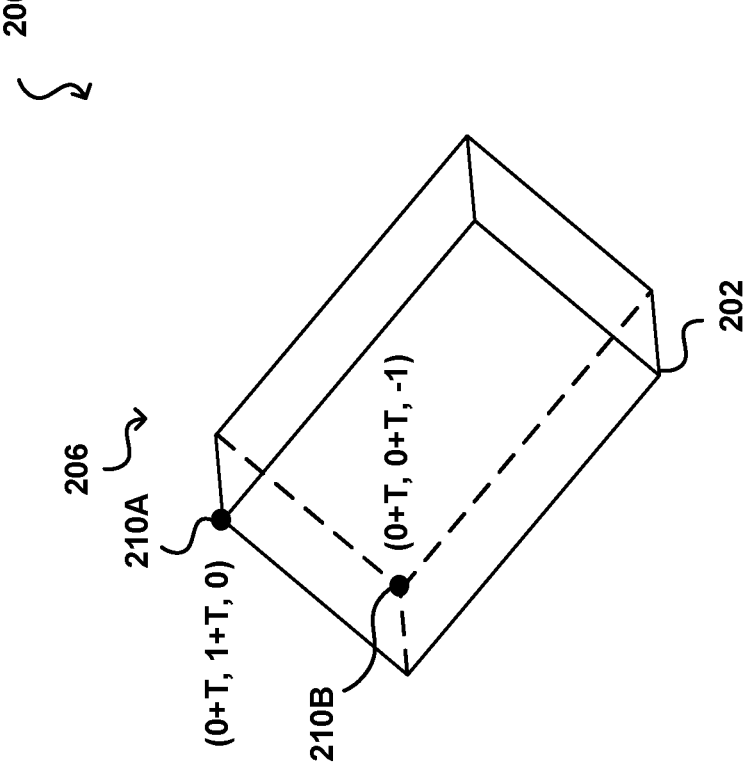
FIG. 2 illustrates an example object moved between two different orientations based on an applied transform, in accordance with various embodiments.
Figure 2:
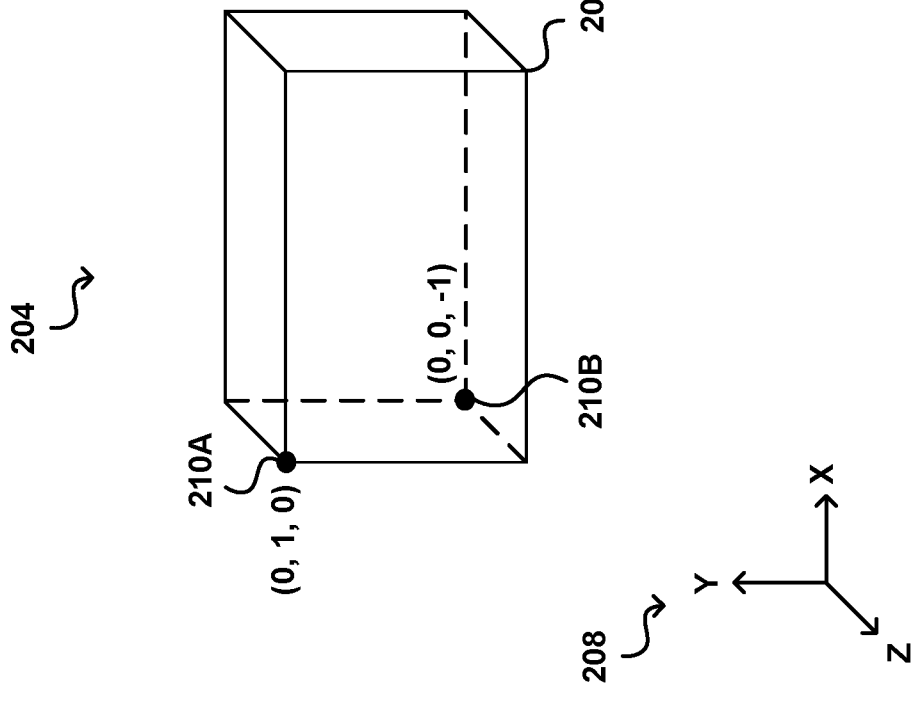

FIG. 2 illustrates representations 200 of an object 202 in a first orientation 204 and a second orientation 206. The example object 202 is shown as a rectangle for simplicity and clarity, but systems and methods may be applied to any object having different shapes and more complex meshes or other representations. A coordinate system 208 represents an x-y-z coordinate system in which different axes of the coordinate system 208 are arranged perpendicular to one another. A first point 210A is positioned at a vertex corresponding to a particular location, such as (0, 1, 0), and a second point 210B is positioned at a vertex corresponding to another particular location, such as (0, 0, −1). Additional points and faces may also be used to represent the object 202. For example, when referring to a polygonal mesh that may be used to form the object 202, a face-vertex mesh may be provided to describe the geometric connectivity of the object 202, such as listing different vertices forming faces and/or providing coordinates and associated faces for different vertexes. Furthermore, vertices may be described for simplicity, by any points along the faces or edges of the object 202 may be used with systems and methods described herein. As noted herein, while various embodiments may be discussed with respect to polygonal meshes, systems and methods may also be applied to different object representations.

In this example, the object 202 has particular coordinates in the first orientation 204 that are shifted or otherwise changed when positioned at the second orientation 206. For example, rotating the object 202 about the z-axis changes the first point 210A to a location (0+T, 1+T, 0) and also changes the second point 210B to a location (0+T, 0+T, −1), where T is some value applied via the transform to shift between the first orientation 204 to the second orientation 206. If the applied transform is a deep transform, as noted above, the object 202 may be provided to an interaction environment with different hash values representing a duplicate or near-duplicate object. As a result, the interaction environment may separately store the object 202 at different orientations, even though the geometry may be substantially consistent (e.g., without some threshold amount) thereby consuming more resources than necessary. Systems and methods of the present disclosure may address this problem by using connectivity data for the object 202 to identity duplicates and/or near-duplicates, determine a coordinate system for the object 202, and then apply transforms to the object 202 to modify a position of a single stored copy of the object 202.

While deep transforms may change the coordinates of points (and normals), their application does not change the order in which the points are stored. Additionally, deep transforms do not alter connectivity information of a mesh. For example, even after the application of a deep transform, faceVertexCounts and faceVertexIndices remain substantially unchanged. Accordingly, systems and methods disclosed in this application may leverage this information to apply hashing to the connectivity data. Doing so may maintain the linear nature of a duplicate detection algorithm.

Various embodiments of the present disclosure may be used to determine a linear transform to map a mesh of a first object to a second object. That is, a first mesh may be mapped onto another mesh based, at least in part, on a determination that the two meshes have identical (or substantially identical) connectivity data. For example, if the transforms applied to the meshes were known, which is not the case with a deep transform, the problem could be defined as:

$$T_1^{-1} M_1 = M = T_2^{-1} M_2$$

where $T_1$ correspond to a first transform, $M_1$ correspond to a first mesh, $T_2$ corresponds to a second transform, and $M_2$ corresponds to a second mesh.

It follows then that the second mesh ($M_2$) can be defined as:

$$T_2 T_1^{-1} M_1 = M_2$$

However, as noted herein, neither M, $T_1$, nor $T_2$ are known when working with deep transforms. For example, the transforms may be applied by the native application used to generate the object and may be applied to points themselves, rather than used as a general equation to manipulate a group of points, vertices, faces, etc. Systems and methods may address this problem by determining alternative transforms $T'_1$ and $T'_2$ such that:

$$T_1'^{-1} M_1 = M' = T_2'^{-1} M_2$$

to allow for mapping between $M_1$ and $M_2$ by:

$$T_2' T_1'^{-1} M_1 = M_2$$

The mesh M' may represent a "canonical form" of the original mesh M and may be determined using a number of different strategies, as will be described herein. These different strategies each leverage the fact that deep transforms do not change the order in which the points of a mesh are given. Accordingly, systems and methods may be used to identify a set of linearly independent vectors for a given object, map the set of vectors to a suspected duplicate (using the same points), and then determine whether the objects are duplicates (within some threshold). Identification of the duplicates and the associated transform then allows a single copy to be retained and modified throughout the interaction environment.

In at least one embodiment, four (4) linearly independent points of $M_1$ are used to define the mesh M', in which the first point is mapped to an origin and the other three are mapped onto three unit vectors of the three main axes (e.g., x, y, and z). Accordingly, $T'_1$ can be defined using these points/vectors, along with its inverse. Then, a similar approach with $M_2$ is used to compute the transform that maps $M_1$ onto $M_2$ in the event the meshes are duplicates and/or near-duplicates.

Figure 3A:
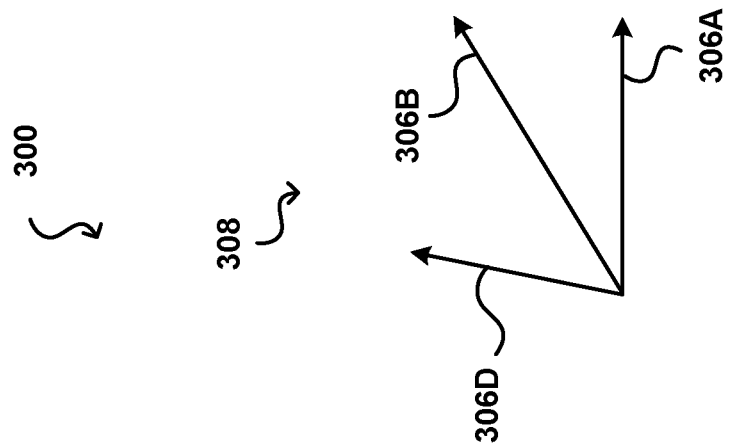
FIG. 3A illustrates an example transform determination technique based on connectivity information for an object, in accordance with various embodiments.
Figure 3A:
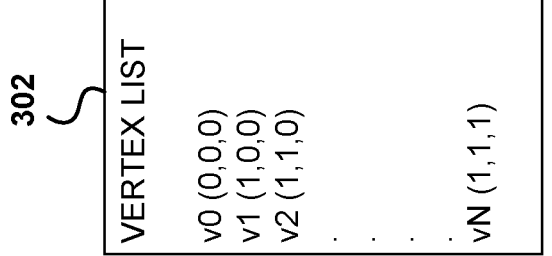
Figure 3A:
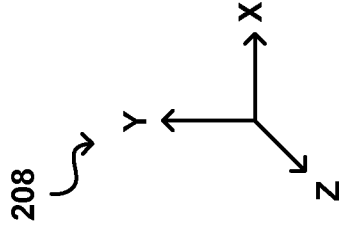

FIG. 3A illustrates a representation 300 in which a series of unit vectors are used to establish a coordinate system to map a first mesh to a second mesh. In this example, the object 202 is positioned according to the coordinate system 208. As noted, the representation of the object 202 as a rectangle is provided for clarity and the object 202 may be any combination of shapes or the like, and moreover, may be represented as a mesh that includes polygons, such as triangles, forming various faces of the object 202. In at least one embodiment, the object 202 may be represented by a vertex list 302 and/or some other textual representation providing information regarding a location of one or more features of the object 202, such as points, vertices, faces, and/or the like. In this example, the vertex list 302 includes vertex positions represented by the x-y-z coordinate system 208. For example, the vertex 304A, represented by v0, is positioned at the point (0,0,0). Additional vertices are shown represented on the object 202, including v1, v2, v4, v5, and v7. Each of these vertices 304B-304F may be associated with a location in 3D space based, at least in part, on the vertex list 302. Furthermore, the ordering of these vertices 304A-304F may remain constant for each object provided to the interaction environment, such that v0 always corresponds to a particular vertex, regardless of its location within 3D space.

Systems and methods of the present disclosure may be used to identify linearly independent vectors extending from a selected origin point in order to develop a transform in order to map between different meshes to identify duplicates and/or near-duplicates. Four points, which in this example are vertices, may be used to identify the linearly independent vectors. The points may be selected from the vertex list 302 at random or based, at least in part, on one or more methods, as will be described herein. Furthermore, while vertices are used in this example, systems and methods may be extended to any points, such as points along faces, points along edges, and/or combinations thereof.

In this example, the order of points (e.g., vertices) provided in the vertex list 302 may be traversed in order to generate different vectors (e.g., directions), determine linear independence for those vectors, and generate a set of vectors (e.g., a tuple) that may be used to convert a mesh representation of an object into canonical form. In this example, a first vertex 304A, represented as v0, is selected as an origin point. This origin point will be used for each of the vectors generated for the subsequent points. Moving through the vertex list 302, the next point provided is the second vertex 304B, represented as v1. A first vector 306A is generated from v0 to v1.

Next, a second vertex 304C, represented as v2, is selected from the vertex list 302 and a second vector 306B is generated from v0 to v2. As shown, the vectors 306A and 306B are linearly independent from one another, even if they are within a common plane, because the first vector 306A may be said to only lie along the x-axis and the second vector 306B is sloped upward along the y-axis. Continuing through the vertex list 302, a third vertex 304D, represented as v3 is selected and a third vector 306C is generated from v0 to v3. However, as noted herein, the vectors must be linearly independent. For example, start and end positions for the set of vectors may be evaluated to ensure that all vectors are not arranged in a common plane. Upon evaluation of the third vector 306C, it can be seen that the third vector 306C is not linearly independent because it lies within a common plane as both the first vector 306A and the second vector 306B. As a result, this third vector 306C is discarded, and the process may continue to select the next point in the vertex list 302, which is a fourth vertex 304E, represented as v4.

Generating a fourth vector 306D from v0 to v4 provides a vector that is outside of the plane of vectors 306A and 306B, and therefore may be considered linearly independent. With the generation of the tuple, a vector representation 308 is illustrated for the object 202, which may be used to convert a mesh representation into canonical form to identify duplications and/or near-duplicates.

Figure 3B:
FIG. 3B illustrates an example transform mapping technique based on connectivity information for an object, in accordance with various embodiments.
Figure 3B:
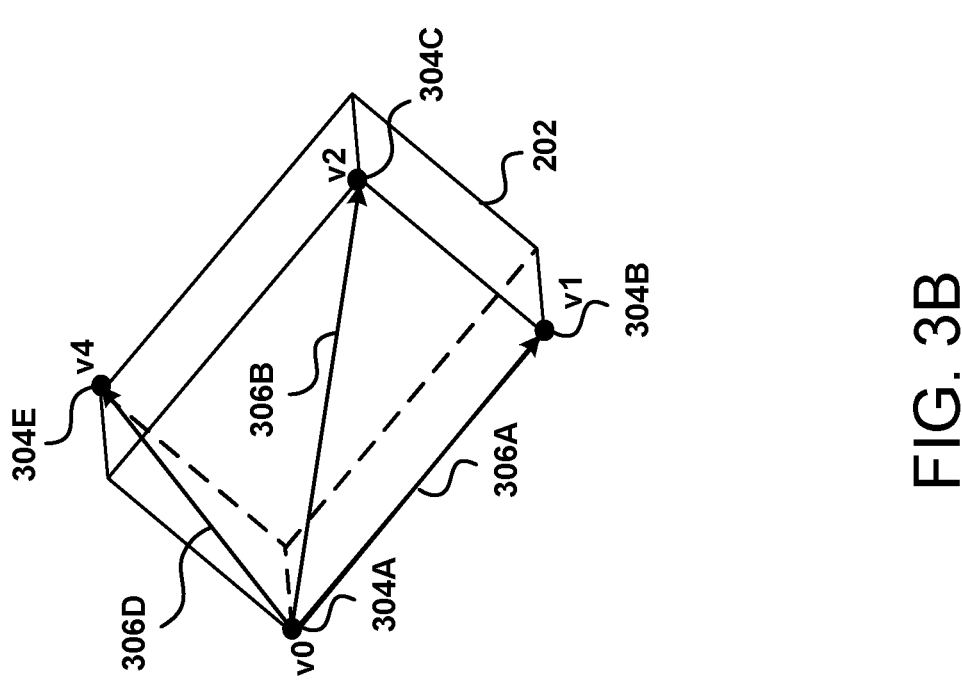
Figure 3B:
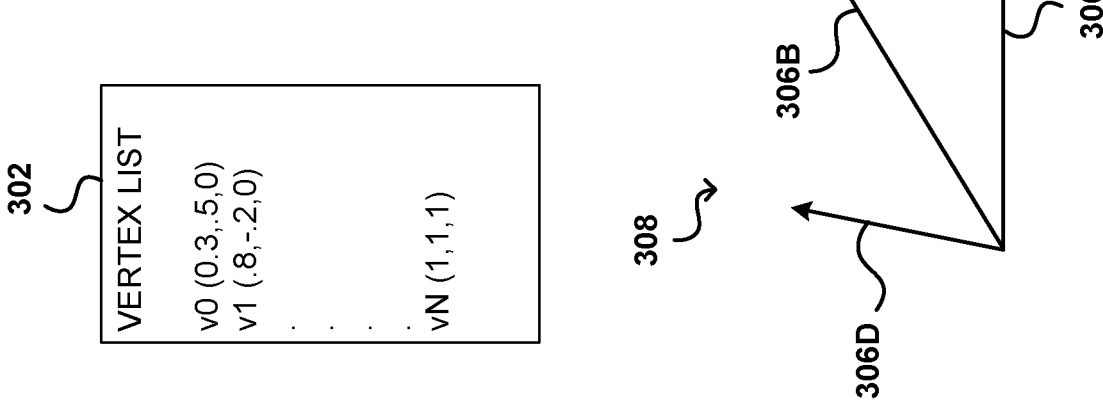

FIG. 3B is a representation 320 in which the object 202 is transformed when compared to FIG. 3A (such as a difference between the first orientation 204 and the second orientation 206). As a result, the various vertices may be at different locations, as shown by the vertex list 302. However, the order of the vertex list 302 is maintained, even though the particular vertices are at different locations. Accordingly, the vector representation 308 may be mapped to the object 202 in FIG. 3B by drawing the vectors from the same selected points. For example, if v0 was the first in the list, v1 was the second, and so forth, the coordinate system 308 could be mapped to the object 202 by drawing vectors from the location at the first position (corresponding to the origin at vertex 304A) to the selected points (vertices 304B, 304C, 304D). If the vectors align, then it may be determined that the objects are duplicates and/or near-duplicates. Accordingly, as shown herein, a transform for the canonical mesh may be determined for the object 202 and only a single copy of the object may be stored and then transformed, in accordance with the developed transform, in order to position the object 202 within the environment multiple times.

Selecting the first four points for an object may only span a linear subspace. As a result, the vectors from these points would not be linearly independent, and more points would need to be selected. Furthermore, points could also lead to sets of vectors that, while linearly independent, may lead to a poor transform when compared to vectors that are more linearly independent. Accordingly, systems and methods of the present disclosure may incorporate both techniques for point select and thresholds or guidelines for linear independence of vectors.

In at least one embodiment, the vector representation 308 generated from the vectors 306A, 306B, 306D may include vectors that are not perpendicular to one another, and as a result, may lead to skewed transformations. Accordingly, it may be desirable to apply one or more methods for point selection (which as noted above, may not necessarily be vertices) in order to obtain sufficiently linear independent vectors while maintaining numerical stability with subsequent transforms. By way of example, a highly tessellated sphere may include a set of the first four points all being in the same area, which implies that the points may be barely linear independent. In this case, it may be beneficial to set a threshold for linear independence, which would cause the system to continue searching for different points. In the case of the tessellated sphere, many points may fall within a region that does not have a threshold quantity of linear independence. Moreover, even if the point were able to exceed the threshold, the combination of points may just barely be deemed linearly independent, and as a result, may be worse than other sets that could be identified more easily with improved results.

One example technique includes pseudo random point selection. This technique may leverage the idea that the first four points may not be necessary for matching two different meshes as long as the same four point are chosen between the meshes. Accordingly, a pseudo random shuffle to the points may be applied for each mesh, using the same seed, and then the first four sufficiently linear independent points may be selected from that new order of points. This shuffling may provide selection of points that are well distributed over a mesh, and therefore, most likely to yield a more stable transform than one in which only the first four points are selected. Furthermore, this approach may also support non-uniform scaling and shearing.

In at least one embodiment, a pseudo maximizing selection may be used to identify the points. With this technique, a set of points is selected using a heuristic. Starting from a reference point, such as the first point or a centroid, the technique includes making a first pass over the point set to select the longest difference vector from the reference point. A second pass may then select a vector that is most perpendicular to the first vector. A third pass may then select a vector that generates the largest determinant. Such techniques may provide benefits such as no longer relying on randomization plus some threshold. Instead, various embodiments may use techniques to optimize the set of points being selected. For example, while methods could be used where all possible quadruples of vertices are evaluated and then the quadruple that provides the most linearly independent set of vectors are selected, such approaches may not be practical because of the time it would take to enumerate all quadruples. Instead, various embodiments may choose different first, second, and third vertices with an assumption that the points will be linear enough.

However, as noted herein, rounding errors may be present within the point describing the object due to the initial application of the deep transform. Therefore, when this technique is applied to symmetric objects, such as a cube, there may be several vectors that would establish a maximum, but one may be "larger" due to the rounding errors. Accordingly, the selection is essentially random. Embodiments may adjust for such rounding errors by weighting or applying a preference to the vector that is found first and only select a new vector if the new vector is better by some relative threshold.

In various embodiments, the vector representation 308 may be configured as a rigid transform in which each of the vectors is perpendicular to one another and a length for the vectors is set to 1. Rigid transforms may provide less skewing and/or stretching when underlying object representations are modified. As a result, when selecting points, faces, and/or the like for generation of the vectors, particular regions may be set to be perpendicular to one another to drive generation of a rigid transform.

In certain embodiments, the section of the maximal vector may not support non-uniform scaling, as well as shearing, because the change of the metric prevents selection of the same vectors. However, this may not be a problem in certain industries, such as manufacturing, because essentially all deep transforms that occur in the context of manufacturing are rigid transforms.

Figure 4:
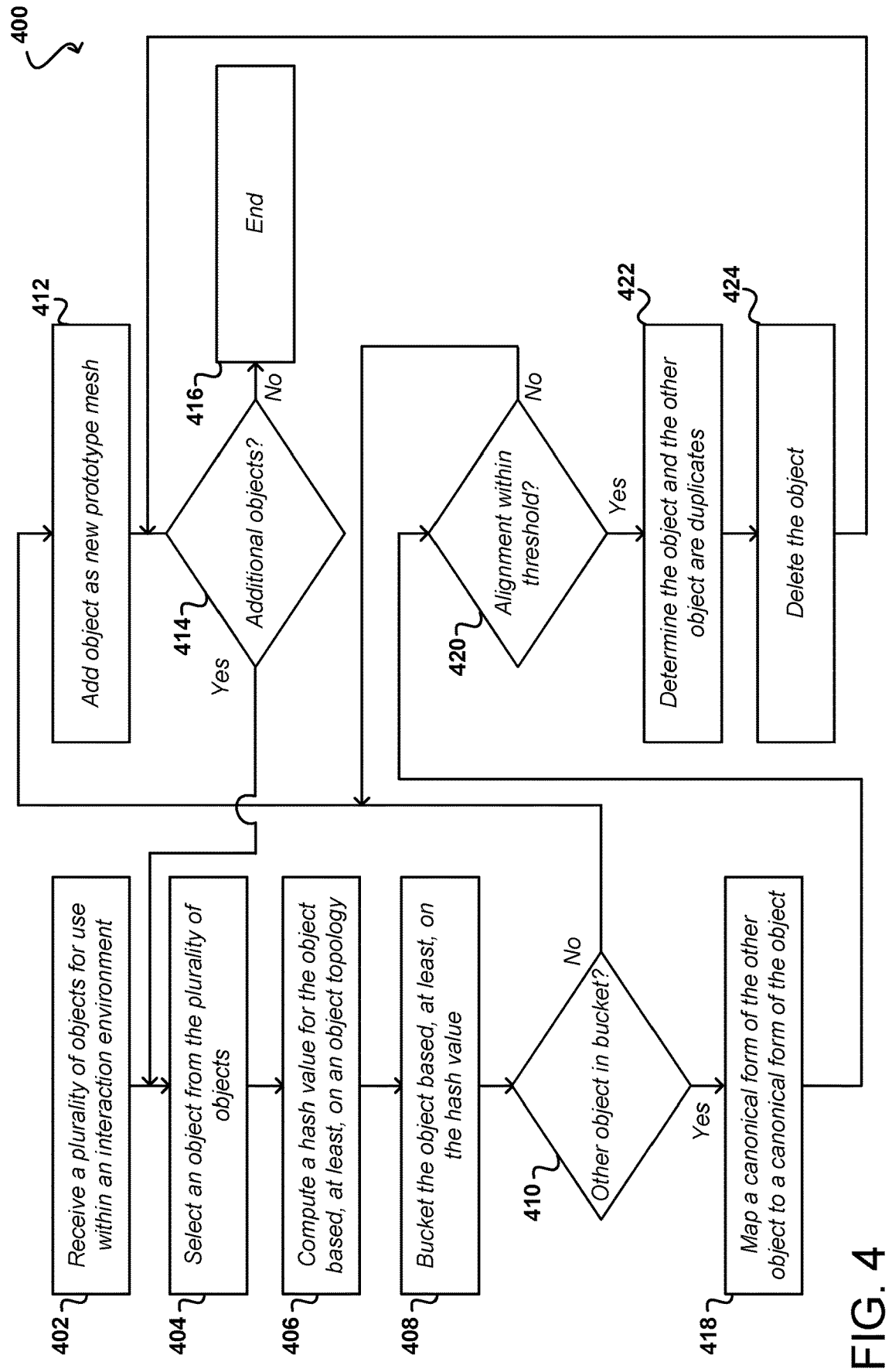
FIG. 4 illustrates an example process for identifying duplicate objects based on connectivity information, in accordance with various embodiments.

FIG. 4 illustrates an example process 400 for identifying and removing duplicate objects from an interaction environment. It should be understood that for this and other processes presented herein that there can be additional, fewer, or alternative operations performed in similar or alternative order, or at least partially in parallel, within the scope of various embodiments unless otherwise specifically stated. In this example, a plurality of objects for use within an interaction environment is received 402. The objects may correspond to 3D objects that may be positioned within a 3D space. For example, the objects may be represented by meshes, NURBS, Bezier patches, subdivision surfaces, points, colors, textures, and/or the like. In at least one embodiment, individual objects from the plurality of objects may be selected 404, for example in an order received, by some command, etc., and hashes may be computed for of the selected object according to the object topology 406. As noted, various techniques that base hashes on point locations may lead to errors due to deep transforms. Systems and methods of the present disclosure may hash based on topology information to reduce the likelihood of such errors. Hashing may provide an integer value based on a given input and, therefore, meshes having a same hash should be placed in the same bucket as an indication that the associated meshes (as one non-limiting example) are likely the same.

In at least one embodiment, the plurality of objects are bucketed according to their respective hashes. Accordingly, as a selected object is hashed, that object may be bucketed (e.g., sorted) based, at least, on its hash value 406. Sorting the object or describing the operating as "bucketing" or the like may include storing information associated with the object in a given location or otherwise tracking a value of the object. In operation, because a hash value of the topology information is used, there is a high likelihood that all the meshes that end up in the same bucket have the same topology. Applying this assumption may be important with respect to run time considerations. However, it may still be desirable to check whether another object, sorted into the same bucket, is indeed equal to the first object associated with that bucket. For example, it may be possible for two different topologies to lead to a same hash value. As a result, a bucket could include multiple hash values associated with multiple object representations.

In at least one embodiment, every bucket (e.g., bin) contains a list of meshes that have already been determined to be not duplicates of each other, where one or more of the meshes may be referred to as prototype meshes. At some point during the comparison, such as at a beginning or early in an evaluation process, that list may be empty. For a new mesh, first the hash is computed and the mesh is inserted into the corresponding bucket. Within the bucket, a comparison may be performed by iterating over the list of prototype meshes. If the new mesh is a duplicate of a prototype mesh, then the new mesh is deleted as the duplicate from the scene and replaced with a reference, which may then be modified by one or more shallow transforms to position the prototype in the appropriate position. Otherwise, the new mesh is added to the list of prototypes in the bucket.

Various embodiments may be used to verify duplicates between meshes using the systems and methods described herein. In at least one embodiment, topology hashing is applied on a per object basis (e.g., one time). Thereafter, the object is put into the appropriate bucket and will not be checked against other meshes that have a different hash value. The object may or may not be the first object within the bucket. If it is, then the object is kept as the representative mesh for the bucket. However, if there is already another object in the bucket, or another object with the appropriate hash is received, the newly incoming mesh may be compared against the mesh of the bucket.

Because common objects should have the same hashes, objects that have the same hashes will be put into the same bucket. As a result, when the select object is hashed and bucketed, it is determined whether or not an object (e.g., a mesh or representation of the object) is already stored within the bucket 410. If not, then the object may be added to the bucket as the new prototype mesh 412 and it may be determined whether there are additional objects from the plurality of objects 414. If so, the process may select a new object and repeat. If not, the process may end 416, which may include rendering a scene within the interaction environment or providing a notification to a user, among other options.

If there are additional objects in the bucket (e.g., prototype meshes), then a canonical form of the other object is mapped to a canonical form of the object 418. Alignment between the mapping may be determined 420. If there is misalignment or alignment that exceeds a threshold, then the object may be added to the bucket as a new prototype mesh 412. If there is alignment within the threshold, then a determination may be made that the object is a duplicate of the other object 422 and the object may be deleted 424. For example, one or more deduplication actions may be applied to keep only the other object as a reference (e.g., a prototype mesh) in the bucket.

Various embodiments of the present disclosure may be further described by the follow pseudocode for evaluations of meshes and/or other representations:

if topologies are not identical, return false (likewise with other data, such as uv coordinates that are not affected by the canonicalization)

for meshes M1 and M2 compute canonical forms M1' of M1 and M2' of M2 if sequence of all points of M1' and M2' differ more than tolerance threshold, return false if sequence of all Normals of M1' and M2' differ more than tolerance threshold, return false (likewise with other directional data such as velocity or acceleration)

Figure 5A:
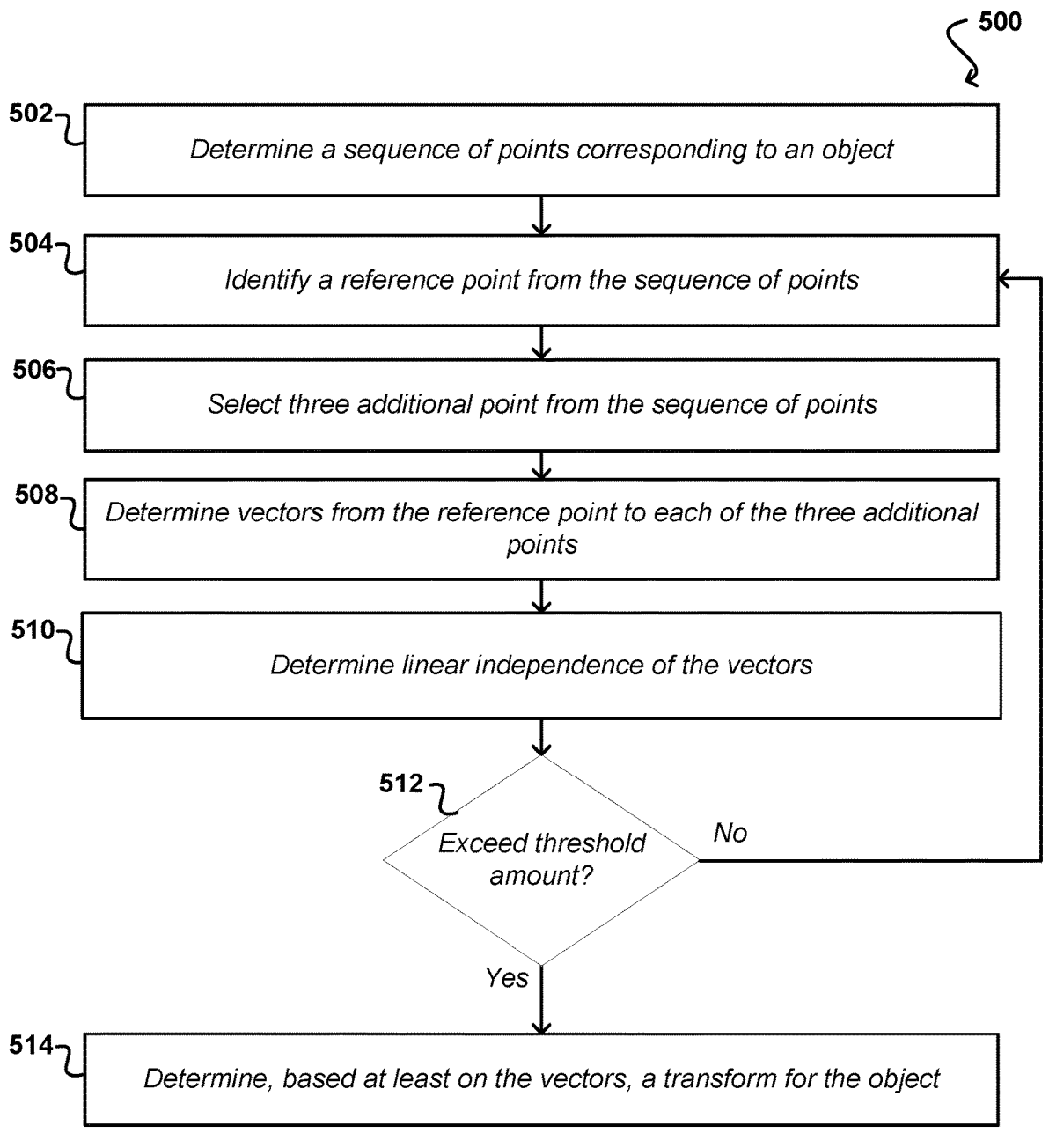
FIG. 5A illustrates an example process for determining a transform associated with an object, in accordance with various embodiments.

FIG. 5A illustrates an example process 500 to determine a transform that sends a mesh into a canonical form. In this example, a sequence of points corresponding to an object is determined 502. The sequence may be associated with connectivity data for the object. A reference point may be selected from the sequence of point 504. The reference point may be the first point in the sequence, a center of the object, a pseudo randomly selected point, or some combination thereof. In at least one embodiment, three additional points are selected from the sequence of points 506. The three additional points may be the three points following the reference point in the sequence, randomly selected points, or any other reasonably selected points.

In at least one embodiment, vectors are determined that extend from the reference point to each of the three other selected points 508. For example, a first vector may extend from the reference point to the first additional point, a second vector may extend from the reference point to the second additional point, and a third vector may extend from the reference point to the third additional point. The vectors may be analyzed to determine their linear independence 510 and to evaluate whether the vectors are linearly independent by a threshold amount 512. If so, then the vectors may then be used to determine a transform applied to the object 514. If not, then a new reference may be selected to restart the process.

Systems and methods of the present disclosure may be directed toward a deterministic procedure for receiving a first mesh and a second mesh, the first mesh defining a sequence of its points, the procedure deriving a first ordered tuple of four points from the first sequence of points derived from the first mesh, which defines a first linear invertible transform, the first transform converting the first mesh into a first canonical form of the first mesh. Likewise, the procedure may also include deriving a second tuple of four points, a second transform and a second canonical form from the second mesh and deciding that the first and the second mesh are considered duplicates so long as the first canonical form and the second canonical form are sufficiently similar.

Figure 5B:
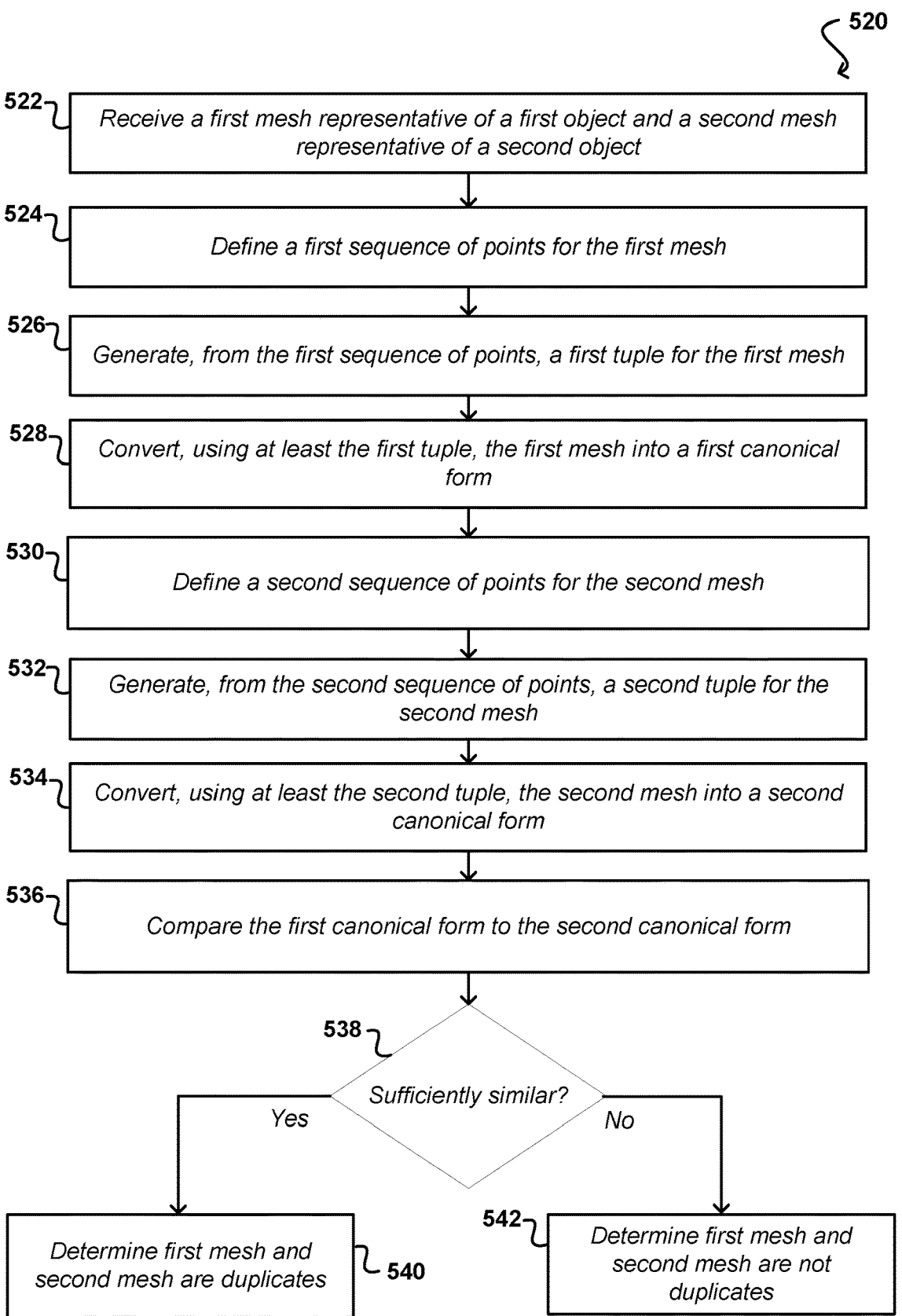
FIG. 5B illustrates an example process for determining duplicate objects based on connectivity information, in accordance with various embodiments.

FIG. 5B illustrates an example process 520 for determining whether a first canonical form of a first object is sufficiently similar to a second canonical form of second object. In this example, a first mesh is received and a second mesh is received 522. The first mesh may correspond to a representation of a first object and the second mesh may correspond to a representation of a second object. The first and second objects may be duplicates and/or near-duplicates, and various embodiments of the present disclosure may be used to make such a determination. For example, a sequence of points may be defined for the first mesh 524. The sequence of points may correspond to different mesh locations, such as but not limited to, vertices, faces, and/or the like. Using the first sequence of points, a first tuple may be generated for the first mesh 526. The first tuple may be a first order tuple that correspond to at four points from the sequence of points. For example, the first order tuple may include information associated with a set of vector extending between points of the set of points, such as three vectors each extending from a common origin. In at least one embodiment, the first tuple may be used to convert the first mesh into canonical form 528.

A similar process may be used to evaluate the second mesh and prepare the second mesh for comparison. For example, a second sequence of points may be defined for the second mesh 530 and a second tuple may be generated for the second mesh 532. As noted, the second tuple may correspond to four point within the sequence of points and may, in at least one embodiment, correspond to information associated with vectors extending from a common origin. Various embodiments may select the same points from the sequence of points used to generate the first tuple. The second tuple may then be used to convert the second mesh into a second canonical form 534. Thereafter, the first canonical form can be compared to the second canonical form 536. Comparisons may include evaluations of positions of various points of the different canonical forms, such as locations of vertices, faces, and/or the like.

In at least one embodiment, a determination may be made to determine whether the first canonical form and the second canonical form are sufficiently similar 538. For example, an exact duplicate may not be required and some threshold amount of similarity may be defined, such as having vertices are locations that are within a percentage difference of one another and/or various other metrics. If the canonical forms are sufficiently similar, then it may be determined that the first mesh and the second mesh are duplicates 540. If not, then it may be determined that the first mesh and the second mesh are not duplicated 542.

Various embodiments may also be directed toward finding the respective tuples by using a first tuple that is sufficiently linear independent. Different techniques may be deployed for linear independence, such as pseudo random shuffles, a determination of most independent tuple (via enumeration), greedy heuristic choosing of the most promising next point, and specific heuristic using a maximizing strategy of some measure related to the linear independence (e.g., 1D max length, 2D dot product, 3D determinant, etc.). Embodiments may also be directed toward accelerating one or more processes using topology hashing.

As discussed, aspects of various approaches presented herein can be lightweight enough to execute on a device such as a client device, such as a personal computer or gaming console, in real time. Such processing can be performed on, or for, content that is generated on, or received by, that client device or received from an external source, such as streaming data or other content received over at least one network. In some instances, the processing and/or determination of this content may be performed by one of these other devices, systems, or entities, then provided to the client device (or another such recipient) for presentation or another such use.

Figure 6:
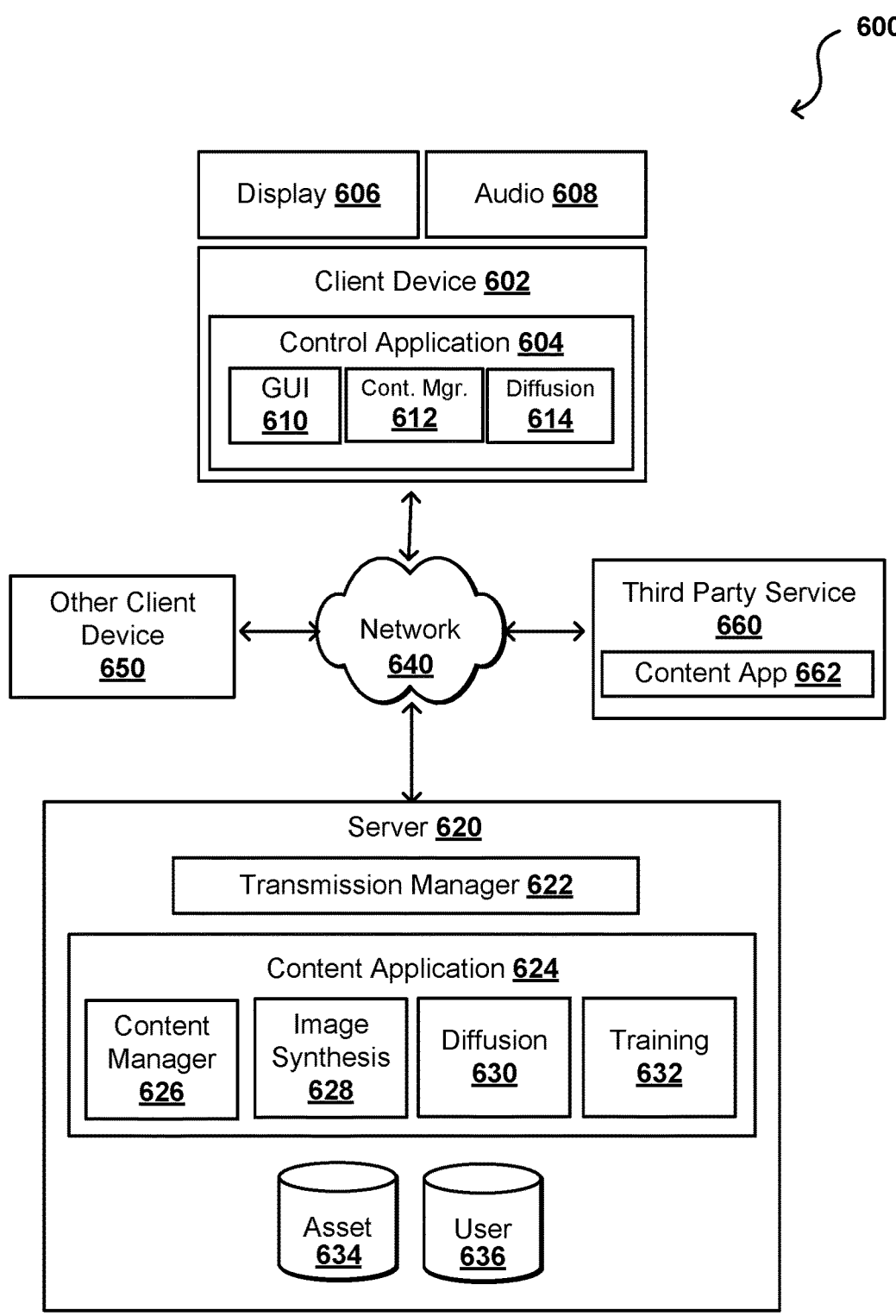
FIG. 6 illustrates components of a distributed system that can be utilized to update or perform inferencing using a machine learning model, according to at least one embodiment.

As an example, FIG. 6 illustrates an example network configuration 600 that can be used to provide, generate, modify, encode, process, and/or transmit image data or other such content. In at least one embodiment, a client device 602 can generate or receive data for a session using components of a control application 604 on client device 602 and data stored locally on that client device. In at least one embodiment, a content application 624 executing on a server 620 (e.g., a cloud server or edge server) may initiate a session associated with at least one client device 602, as may utilize a session manager and user data stored in a user database 636, and can cause content such as one or more digital assets (e.g., object representations) from an asset repository 634 to be determined by a content manager 626. A content manager 626 may work with an image synthesis module 628 to generate or synthesize new objects, digital assets, or other such content to be provided for presentation via the client device 602. In at least one embodiment, this image synthesis module 628 can use one or more neural networks, or machine learning models, which can be trained or updated using a training module 632 or system that is on, or in communication with, the server 620. This can include training and/or using a diffusion model 630 to generate content tiles that can be used by an image synthesis module 628, for example, to apply a non-repeating texture to a region of an environment for which image or video data is to be presented via a client device 602. At least a portion of the generated content may be transmitted to the client device 602 using an appropriate transmission manager 622 to send by download, streaming, or another such transmission channel. An encoder may be used to encode and/or compress at least some of this data before transmitting to the client device 602. In at least one embodiment, the client device 602 receiving such content can provide this content to a corresponding control application 604, which may also or alternatively include a graphical user interface 610, content manager 612, and image synthesis or diffusion module 614 for use in providing, synthesizing, modifying, or using content for presentation (or other purposes) on or by the client device 602. A decoder may also be used to decode data received over the network 640 for presentation via client device 602, such as image or video content through a display 606 and audio, such as sounds and music, through at least one audio playback device 608, such as speakers or headphones. In at least one embodiment, at least some of this content may already be stored on, rendered on, or accessible to client device 602 such that transmission over network 640 is not required for at least that portion of content, such as where that content may have been previously downloaded or stored locally on a hard drive or optical disk. In at least one embodiment, a transmission mechanism such as data streaming can be used to transfer this content from server 620, or user database 636, to client device 602. In at least one embodiment, at least a portion of this content can be obtained, enhanced, and/or streamed from another source, such as a third party service 660 or other client device 650, that may also include a content application 662 for generating, enhancing, or providing content. In at least one embodiment, portions of this functionality can be performed using multiple computing devices, or multiple processors within one or more computing devices, such as may include a combination of CPUs and GPUs.

In this example, these client devices can include any appropriate computing devices, as may include a desktop computer, notebook computer, set-top box, streaming device, gaming console, smartphone, tablet computer, VR headset, AR goggles, wearable computer, or a smart television. Each client device can submit a request across at least one wired or wireless network, as may include the Internet, an Ethernet, a local area network (LAN), or a cellular network, among other such options. In this example, these requests can be submitted to an address associated with a cloud provider, who may operate or control one or more electronic resources in a cloud provider environment, such as may include a data center or server farm. In at least one embodiment, the request may be received or processed by at least one edge server, that sits on a network edge and is outside at least one security layer associated with the cloud provider environment. In this way, latency can be reduced by enabling the client devices to interact with servers that are in closer proximity, while also improving security of resources in the cloud provider environment.

In at least one embodiment, such a system can be used for performing graphical rendering operations. In other embodiments, such a system can be used for other purposes, such as for providing image or video content to test or validate autonomous machine applications, or for performing deep learning operations. In at least one embodiment, such a system can be implemented using an edge device, or may incorporate one or more Virtual Machines (VMs). In at least one embodiment, such a system can be implemented at least partially in a data center or at least partially using cloud computing resources.

Inference and Training Logic

Figure 7A:
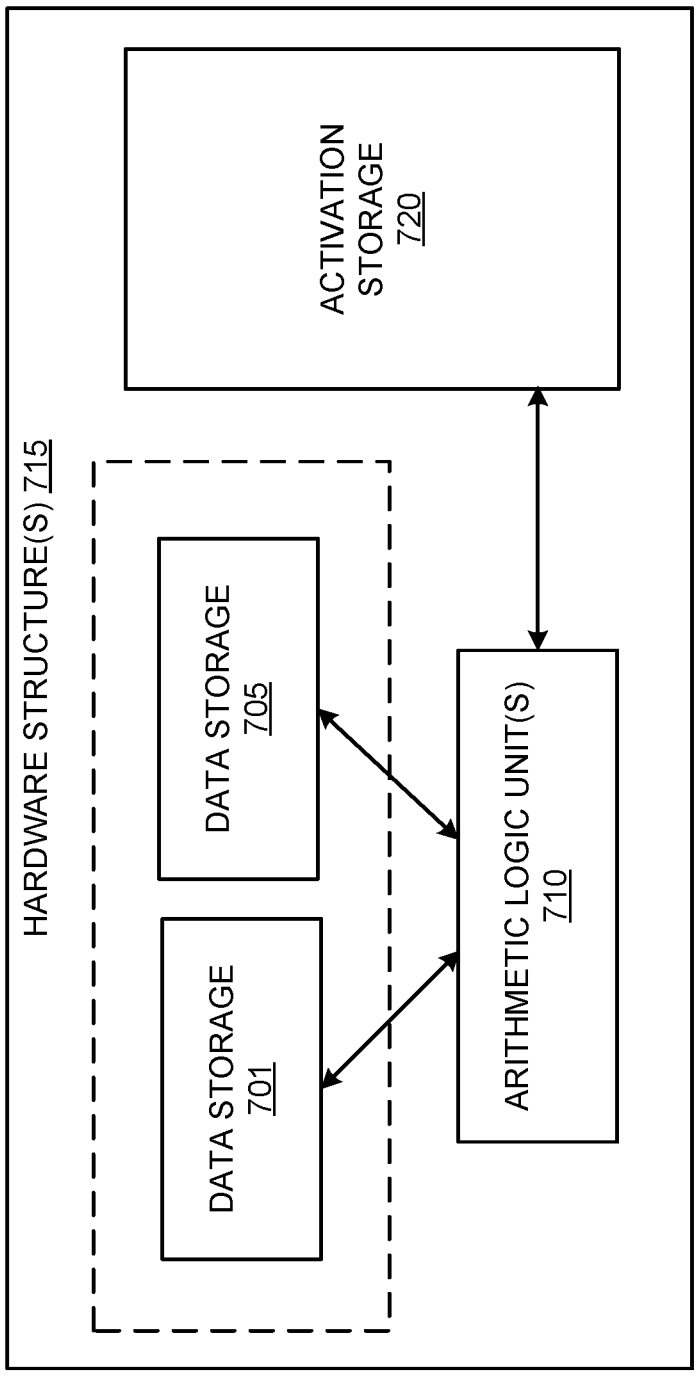
FIG. 7A illustrates inference and/or training logic, according to at least one embodiment.

FIG. 7A illustrates inference and/or training logic 715 used to perform inferencing and/or training operations associated with one or more embodiments. Details regarding inference and/or training logic 715 are provided below in conjunction with FIGS. 7A and/or 7B.

In at least one embodiment, inference and/or training logic 715 may include, without limitation, code and/or data storage 701 to store forward and/or output weight and/or input/output data, and/or other parameters to configure neurons or layers of a neural network trained and/or used for inferencing in aspects of one or more embodiments. In at least one embodiment, training logic 715 may include, or be coupled to code and/or data storage 701 to store graph code or other software to control timing and/or order, in which weight and/or other parameter information is to be loaded to configure, logic, including integer and/or floating point units (collectively, arithmetic logic units (ALUs). In at least one embodiment, code, such as graph code, loads weight or other parameter information into processor ALUs based on an architecture of a neural network to which the code corresponds. In at least one embodiment, code and/or data storage 701 stores weight parameters and/or input/output data of each layer of a neural network trained or used in conjunction with one or more embodiments during forward propagation of input/output data and/or weight parameters during training and/or inferencing using aspects of one or more embodiments. In at least one embodiment, any portion of code and/or data storage 701 may be included with other on-chip or off-chip data storage, including a processor's L1, L2, or L3 cache or system memory.

In at least one embodiment, any portion of code and/or data storage 701 may be internal or external to one or more processors or other hardware logic devices or circuits. In at least one embodiment, code and/or data storage 701 may be cache memory, dynamic randomly addressable memory ("DRAM"), static randomly addressable memory ("SRAM"), non-volatile memory (e.g., Flash memory), or other storage. In at least one embodiment, choice of whether code and/or data storage 701 is internal or external to a processor, for example, or comprised of DRAM, SRAM, Flash or some other storage type may depend on available storage on-chip versus off-chip, latency requirements of training and/or inferencing functions being performed, batch size of data used in inferencing and/or training of a neural network, or some combination of these factors.

In at least one embodiment, inference and/or training logic 715 may include, without limitation, a code and/or data storage 705 to store backward and/or output weight and/or input/output data corresponding to neurons or layers of a neural network trained and/or used for inferencing in aspects of one or more embodiments. In at least one embodiment, code and/or data storage 705 stores weight parameters and/or input/output data of each layer of a neural network trained or used in conjunction with one or more embodiments during backward propagation of input/output data and/or weight parameters during training and/or inferencing using aspects of one or more embodiments. In at least one embodiment, training logic 715 may include, or be coupled to code and/or data storage 705 to store graph code or other software to control timing and/or order, in which weight and/or other parameter information is to be loaded to configure, logic, including integer and/or floating point units (collectively, arithmetic logic units (ALUs). In at least one embodiment, code, such as graph code, loads weight or other parameter information into processor ALUs based on an architecture of a neural network to which the code corresponds. In at least one embodiment, any portion of code and/or data storage 705 may be included with other on-chip or off-chip data storage, including a processor's L1, L2, or L3 cache or system memory. In at least one embodiment, any portion of code and/or data storage 705 may be internal or external to on one or more processors or other hardware logic devices or circuits. In at least one embodiment, code and/or data storage 705 may be cache memory, DRAM, SRAM, non-volatile memory (e.g., Flash memory), or other storage. In at least one embodiment, choice of whether code and/or data storage 705 is internal or external to a processor, for example, or comprised of DRAM, SRAM, Flash or some other storage type may depend on available storage on-chip versus off-chip, latency requirements of training and/or inferencing functions being performed, batch size of data used in inferencing and/or training of a neural network, or some combination of these factors.

In at least one embodiment, code and/or data storage 701 and code and/or data storage 705 may be separate storage structures. In at least one embodiment, code and/or data storage 701 and code and/or data storage 705 may be same storage structure. In at least one embodiment, code and/or data storage 701 and code and/or data storage 705 may be partially same storage structure and partially separate storage structures. In at least one embodiment, any portion of code and/or data storage 701 and code and/or data storage 705 may be included with other on-chip or off-chip data storage, including a processor's L1, L2, or L3 cache or system memory.

In at least one embodiment, inference and/or training logic 715 may include, without limitation, one or more arithmetic logic unit(s) ("ALU(s)") 710, including integer and/or floating point units, to perform logical and/or mathematical operations based, at least in part on, or indicated by, training and/or inference code (e.g., graph code), a result of which may produce activations (e.g., output values from layers or neurons within a neural network) stored in an activation storage 720 that are functions of input/output and/or weight parameter data stored in code and/or data storage 701 and/or code and/or data storage 705. In at least one embodiment, activations stored in activation storage 720 are generated according to linear algebraic and or matrix-based mathematics performed by ALU(s) 710 in response to performing instructions or other code, wherein weight values stored in code and/or data storage 705 and/or code and/or data storage 701 are used as operands along with other values, such as bias values, gradient information, momentum values, or other parameters or hyperparameters, any or all of which may be stored in code and/or data storage 705 or code and/or data storage 701 or another storage on or off-chip.

In at least one embodiment, ALU(s) 710 are included within one or more processors or other hardware logic devices or circuits, whereas in another embodiment, ALU(s) 710 may be external to a processor or other hardware logic device or circuit that uses them (e.g., a co-processor). In at least one embodiment, ALU(s) 710 may be included within a processor's execution units or otherwise within a bank of ALUs accessible by a processor's execution units either within same processor or distributed between different processors of different types (e.g., central processing units, graphics processing units, fixed function units, etc.). In at least one embodiment, code and/or data storage 701, code and/or data storage 705, and activation storage 720 may be on same processor or other hardware logic device or circuit, whereas in another embodiment, they may be in different processors or other hardware logic devices or circuits, or some combination of same and different processors or other hardware logic devices or circuits. In at least one embodiment, any portion of activation storage 720 may be included with other on-chip or off-chip data storage, including a processor's L1, L2, or L3 cache or system memory. Furthermore, inferencing and/or training code may be stored with other code accessible to a processor or other hardware logic or circuit and fetched and/or processed using a processor's fetch, decode, scheduling, execution, retirement and/or other logical circuits.

In at least one embodiment, activation storage 720 may be cache memory, DRAM, SRAM, non-volatile memory (e.g., Flash memory), or other storage. In at least one embodiment, activation storage 720 may be completely or partially within or external to one or more processors or other logical circuits. In at least one embodiment, choice of whether activation storage 720 is internal or external to a processor, for example, or comprised of DRAM, SRAM, Flash or some other storage type may depend on available storage on-chip versus off-chip, latency requirements of training and/or inferencing functions being performed, batch size of data used in inferencing and/or training of a neural network, or some combination of these factors. In at least one embodiment, inference and/or training logic 715 illustrated in FIG. 7A may be used in conjunction with an application-specific integrated circuit ("ASIC"), such as Tensorflow® Processing Unit from Google, an inference processing unit (IPU) from Graphcore™, or a Nervana® (e.g., "Lake Crest") processor from Intel Corp. In at least one embodiment, inference and/or training logic 715 illustrated in FIG. 7A may be used in conjunction with central processing unit ("CPU") hardware, graphics processing unit ("GPU") hardware or other hardware, such as field programmable gate arrays ("FPGAs").

Figure 7B:
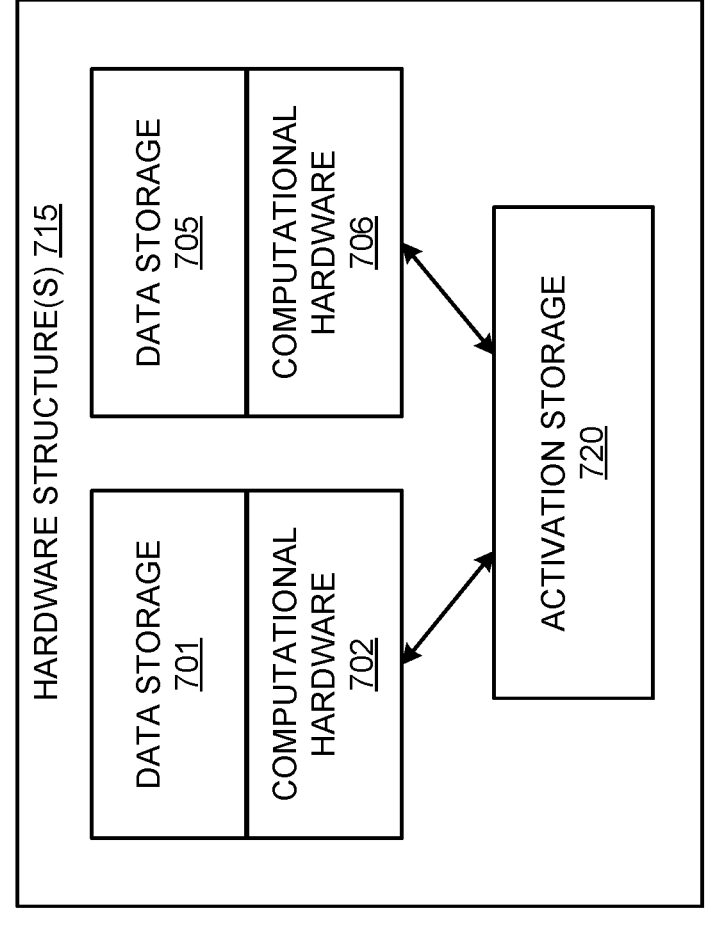
FIG. 7B illustrates inference and/or training logic, according to at least one embodiment.

FIG. 7B illustrates inference and/or training logic 715, according to at least one or more embodiments. In at least one embodiment, inference and/or training logic 715 may include, without limitation, hardware logic in which computational resources are dedicated or otherwise exclusively used in conjunction with weight values or other information corresponding to one or more layers of neurons within a neural network. In at least one embodiment, inference and/or training logic 715 illustrated in FIG. 7B may be used in conjunction with an application-specific integrated circuit (ASIC), such as Tensorflow® Processing Unit from Google, an inference processing unit (IPU) from Graphcore™, or a Nervana® (e.g., "Lake Crest") processor from Intel Corp. In at least one embodiment, inference and/or training logic 715 illustrated in FIG. 7B may be used in conjunction with central processing unit (CPU) hardware, graphics processing unit (GPU) hardware or other hardware, such as field programmable gate arrays (FPGAs). In at least one embodiment, inference and/or training logic 715 includes, without limitation, code and/or data storage 701 and code and/or data storage 705, which may be used to store code (e.g., graph code), weight values and/or other information, including bias values, gradient information, momentum values, and/or other parameter or hyperparameter information. In at least one embodiment illustrated in FIG. 7B, each of code and/or data storage 701 and code and/or data storage 705 is associated with a dedicated computational resource, such as computational hardware 702 and computational hardware 706, respectively. In at least one embodiment, each of computational hardware 702 and computational hardware 706 comprises one or more ALUs that perform mathematical functions, such as linear algebraic functions, only on information stored in code and/or data storage 701 and code and/or data storage 705, respectively, result of which is stored in activation storage 720.

In at least one embodiment, each of code and/or data storage 701 and 705 and corresponding computational hardware 702 and 706, respectively, correspond to different layers of a neural network, such that resulting activation from one "storage/computational pair 701/702" of code and/or data storage 701 and computational hardware 702 is provided as an input to "storage/computational pair 705/706" of code and/or data storage 705 and computational hardware 706, in order to mirror conceptual organization of a neural network. In at least one embodiment, each of storage/computational pairs 701/702 and 705/706 may correspond to more than one neural network layer. In at least one embodiment, additional storage/computation pairs (not shown) subsequent to or in parallel with storage computation pairs 701/702 and 705/706 may be included in inference and/or training logic 715.

Data Center

Figure 8:
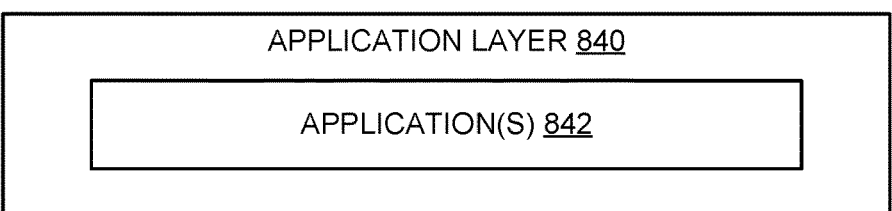
FIG. 8 illustrates an example data center system, according to at least one embodiment.
Figure 8:
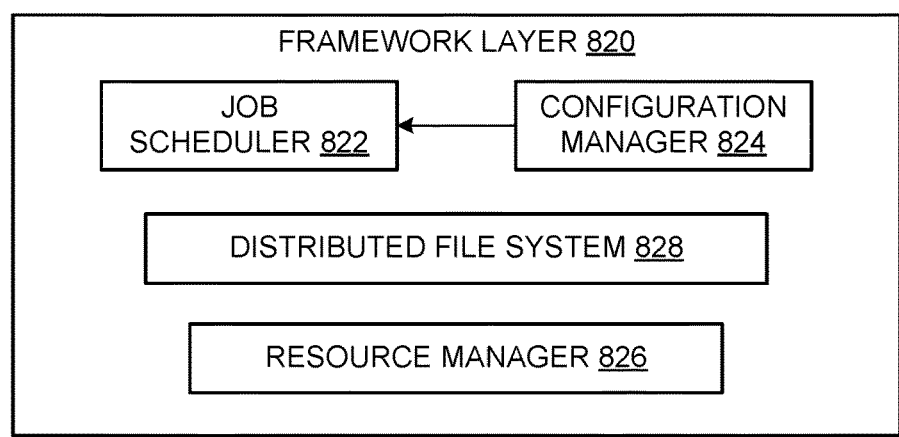
Figure 8:
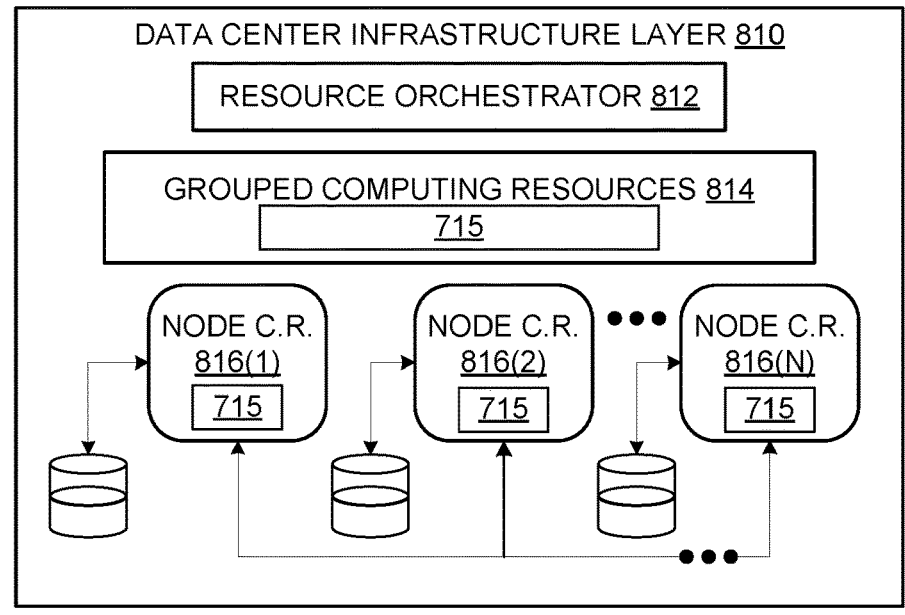

FIG. 8 illustrates an example data center 800, in which at least one embodiment may be used. In at least one embodiment, data center 800 includes a data center infrastructure layer 810, a framework layer 820, a software layer 830, and an application layer 840.

In at least one embodiment, as shown in FIG. 8, data center infrastructure layer 810 may include a resource orchestrator 812, grouped computing resources 814, and node computing resources ("node C.R.s") 816(1)-816(N), where "N" represents any whole, positive integer. In at least one embodiment, node C.R.s 816(1)-816(N) may include, but are not limited to, any number of central processing units ("CPUs") or other processors (including accelerators, field programmable gate arrays (FPGAs), graphics processors, etc.), memory devices (e.g., dynamic read-only memory), storage devices (e.g., solid state or disk drives), network input/output ("NW I/O") devices, network switches, virtual machines ("VMs"), power modules, and cooling modules, etc. In at least one embodiment, one or more node C.R.s from among node C.R.s 816(1)-816(N) may be a server having one or more of above-mentioned computing resources.

In at least one embodiment, grouped computing resources 814 may include separate groupings of node C.R.s housed within one or more racks (not shown), or many racks housed in data centers at various geographical locations (also not shown). Separate groupings of node C.R.s within grouped computing resources 814 may include grouped compute, network, memory or storage resources that may be configured or allocated to support one or more workloads. In at least one embodiment, several node C.R.s including CPUs or processors may grouped within one or more racks to provide compute resources to support one or more workloads. In at least one embodiment, one or more racks may also include any number of power modules, cooling modules, and network switches, in any combination.

In at least one embodiment, resource orchestrator 812 may configure or otherwise control one or more node C.R.s 816(1)-816(N) and/or grouped computing resources 814. In at least one embodiment, resource orchestrator 812 may include a software design infrastructure ("SDI") management entity for data center 800. In at least one embodiment, resource orchestrator 812 may include hardware, software or some combination thereof.

In at least one embodiment, as shown in FIG. 8, framework layer 820 includes a job scheduler 822, a configuration manager 824, a resource manager 826 and a distributed file system 828. In at least one embodiment, framework layer 820 may include a framework to support software 832 of software layer 830 and/or one or more application(s) 842 of application layer 840. In at least one embodiment, software 832 or application(s) 842 may respectively include web-based service software or applications, such as those provided by Amazon Web Services, Google Cloud and Microsoft Azure. In at least one embodiment, framework layer 820 may be, but is not limited to, a type of free and open-source software web application framework such as Apache Spark™ (hereinafter "Spark") that may use distributed file system 828 for large-scale data processing (e.g., "big data"). In at least one embodiment, job scheduler 822 may include a Spark driver to facilitate scheduling of workloads supported by various layers of data center 800. In at least one embodiment, configuration manager 824 may be capable of configuring different layers such as software layer 830 and framework layer 820 including Spark and distributed file system 828 for supporting large-scale data processing. In at least one embodiment, resource manager 826 may be capable of managing clustered or grouped computing resources mapped to or allocated for support of distributed file system 828 and job scheduler 822. In at least one embodiment, clustered or grouped computing resources may include grouped computing resource 814 at data center infrastructure layer 810. In at least one embodiment, resource manager 826 may coordinate with resource orchestrator 812 to manage these mapped or allocated computing resources.

In at least one embodiment, software 832 included in software layer 830 may include software used by at least portions of node C.R.s 816(1)-816(N), grouped computing resources 814, and/or distributed file system 828 of framework layer 820. The one or more types of software may include, but are not limited to, Internet web page search software, e-mail virus scan software, database software, and streaming video content software.

In at least one embodiment, application(s) 842 included in application layer 840 may include one or more types of applications used by at least portions of node C.R.s 816(1)-816(N), grouped computing resources 814, and/or distributed file system 828 of framework layer 820. One or more types of applications may include, but are not limited to, any number of a genomics application, a cognitive compute, and a machine learning application, including training or inferencing software, machine learning framework software (e.g., PyTorch, TensorFlow, Caffe, etc.) or other machine learning applications used in conjunction with one or more embodiments.

In at least one embodiment, any of configuration manager 824, resource manager 826, and resource orchestrator 812 may implement any number and type of self-modifying actions based on any amount and type of data acquired in any technically feasible fashion. In at least one embodiment, self-modifying actions may relieve a data center operator of data center 800 from making possibly bad configuration decisions and possibly avoiding underused and/or poor performing portions of a data center.

In at least one embodiment, data center 800 may include tools, services, software or other resources to train one or more machine learning models or predict or infer information using one or more machine learning models according to one or more embodiments described herein. For example, in at least one embodiment, a machine learning model may be trained by calculating weight parameters according to a neural network architecture using software and computing resources described above with respect to data center 800. In at least one embodiment, trained machine learning models corresponding to one or more neural networks may be used to infer or predict information using resources described above with respect to data center 800 by using weight parameters calculated through one or more training techniques described herein.

In at least one embodiment, data center may use CPUs, application-specific integrated circuits (ASICs), GPUs, FPGAs, or other hardware to perform training and/or inferencing using above-described resources. Moreover, one or more software and/or hardware resources described above may be configured as a service to allow users to train or performing inferencing of information, such as image recognition, speech recognition, or other artificial intelligence services.

Inference and/or training logic 715 are used to perform inferencing and/or training operations associated with one or more embodiments. Details regarding inference and/or training logic 715 are provided below in conjunction with FIGS. 7A and/or 7B. In at least one embodiment, inference and/or training logic 715 may be used in system FIG. 8 for inferencing or predicting operations based, at least in part, on weight parameters calculated using neural network training operations, neural network functions and/or architectures, or neural network use cases described herein.

Such components can be used for duplicate identification.

Computer Systems

Figure 9:
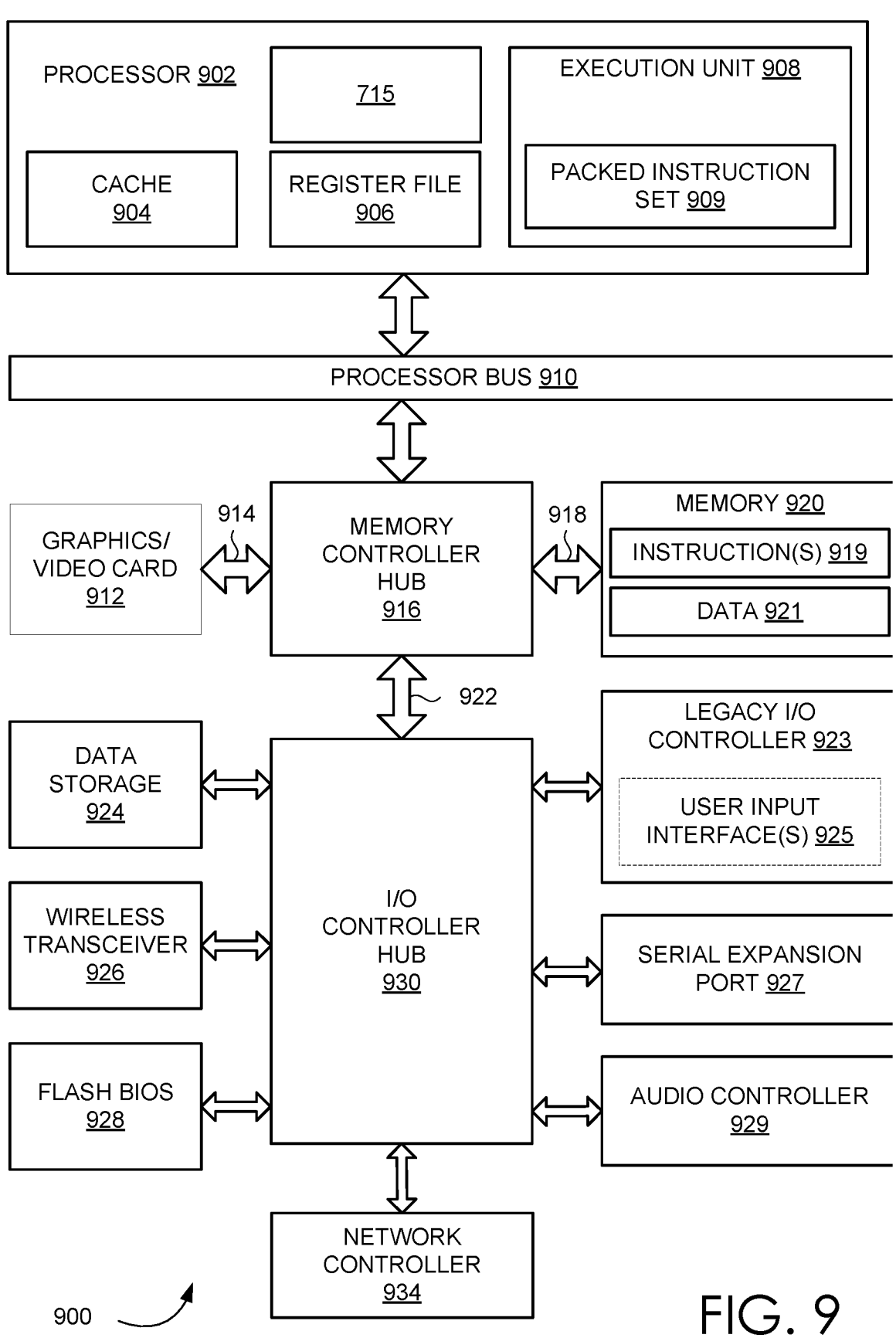
FIG. 9 illustrates a computer system, according to at least one embodiment.

FIG. 9 is a block diagram illustrating an exemplary computer system, which may be a system with interconnected devices and components, a system-on-a-chip (SOC) or some combination thereof 900 formed with a processor that may include execution units to execute an instruction, according to at least one embodiment. In at least one embodiment, computer system 900 may include, without limitation, a component, such as a processor 902 to employ execution units including logic to perform algorithms for process data, in accordance with present disclosure, such as in embodiment described herein. In at least one embodiment, computer system 900 may include processors, such as PENTIUM® Processor family, Xeon™, Itanium®, XScale™ and/or StrongARM™, Intel® Core™, or Intel® Nervana™ microprocessors available from Intel Corporation of Santa Clara, California, although other systems (including PCs having other microprocessors, engineering workstations, set-top boxes and like) may also be used. In at least one embodiment, computer system 900 may execute a version of WINDOWS' operating system available from Microsoft Corporation of Redmond, Wash., although other operating systems (UNIX and Linux for example), embedded software, and/or graphical user interfaces, may also be used.

Embodiments may be used in other devices such as handheld devices and embedded applications. Some examples of handheld devices include cellular phones, Internet Protocol devices, digital cameras, personal digital assistants ("PDAs"), and handheld PCs. In at least one embodiment, embedded applications may include a microcontroller, a digital signal processor ("DSP"), system on a chip, network computers ("NetPCs"), set-top boxes, network hubs, wide area network ("WAN") switches, or any other system that may perform one or more instructions in accordance with at least one embodiment.

In at least one embodiment, computer system 900 may include, without limitation, processor 902 that may include, without limitation, one or more execution units 908 to perform machine learning model training and/or inferencing according to techniques described herein. In at least one embodiment, computer system 900 is a single processor desktop or server system, but in another embodiment computer system 900 may be a multiprocessor system. In at least one embodiment, processor 902 may include, without limitation, a complex instruction set computing ("CISC") microprocessor, a reduced instruction set computing ("RISC") microprocessor, a very long instruction word ("VLIW") computing microprocessor, a processor implementing a combination of instruction sets, or any other processor device, such as a digital signal processor, for example. In at least one embodiment, processor 902 may be coupled to a processor bus 910 that may transmit data signals between processor 902 and other components in computer system 900.

In at least one embodiment, processor 902 may include, without limitation, a Level 1 ("L1") internal cache memory ("cache") 904. In at least one embodiment, processor 902 may have a single internal cache or multiple levels of internal cache. In at least one embodiment, cache memory may reside external to processor 902. Other embodiments may also include a combination of both internal and external caches depending on particular implementation and needs. In at least one embodiment, register file 906 may store different types of data in various registers including, without limitation, integer registers, floating point registers, status registers, and instruction pointer register.

In at least one embodiment, execution unit 908, including, without limitation, logic to perform integer and floating point operations, also resides in processor 902. In at least one embodiment, processor 902 may also include a microcode ("ucode") read only memory ("ROM") that stores microcode for certain macro instructions. In at least one embodiment, execution unit 908 may include logic to handle a packed instruction set 909. In at least one embodiment, by including packed instruction set 909 in an instruction set of a general-purpose processor 902, along with associated circuitry to execute instructions, operations used by many multimedia applications may be performed using packed data in a general-purpose processor 902. In one or more embodiments, many multimedia applications may be accelerated and executed more efficiently by using full width of a processor's data bus for performing operations on packed data, which may eliminate need to transfer smaller units of data across processor's data bus to perform one or more operations one data element at a time.

In at least one embodiment, execution unit 908 may also be used in microcontrollers, embedded processors, graphics devices, DSPs, and other types of logic circuits. In at least one embodiment, computer system 900 may include, without limitation, a memory 920. In at least one embodiment, memory 920 may be implemented as a Dynamic Random Access Memory ("DRAM") device, a Static Random Access Memory ("SRAM") device, flash memory device, or other memory device. In at least one embodiment, memory 920 may store instruction(s) 919 and/or data 921 represented by data signals that may be executed by processor 902.

In at least one embodiment, system logic chip may be coupled to processor bus 910 and memory 920. In at least one embodiment, system logic chip may include, without limitation, a memory controller hub ("MCH") 916, and processor 902 may communicate with MCH 916 via processor bus 910. In at least one embodiment, MCH 916 may provide a high bandwidth memory path 918 to memory 920 for instruction and data storage and for storage of graphics commands, data and textures. In at least one embodiment, MCH 916 may direct data signals between processor 902, memory 920, and other components in computer system 900 and to bridge data signals between processor bus 910, memory 920, and a system I/O 922. In at least one embodiment, system logic chip may provide a graphics port for coupling to a graphics controller. In at least one embodiment, MCH 916 may be coupled to memory 920 through a high bandwidth memory path 918 and graphics/video card 912 may be coupled to MCH 916 through an Accelerated Graphics Port ("AGP") interconnect 914.

In at least one embodiment, computer system 900 may use system I/O 922 that is a proprietary hub interface bus to couple MCH 916 to I/O controller hub ("ICH") 930. In at least one embodiment, ICH 930 may provide direct connections to some I/O devices via a local I/O bus. In at least one embodiment, local I/O bus may include, without limitation, a high-speed I/O bus for connecting peripherals to memory 920, chipset, and processor 902. Examples may include, without limitation, an audio controller 929, a firmware hub ("flash BIOS") 928, a wireless transceiver 926, a data storage 924, a legacy I/O controller 923 containing user input and keyboard interface(s) 925, a serial expansion port 927, such as Universal Serial Bus ("USB"), and a network controller 934. Data storage 924 may comprise a hard disk drive, a floppy disk drive, a CD-ROM device, a flash memory device, or other mass storage device.

In at least one embodiment, FIG. 9 illustrates a system, which includes interconnected hardware devices or "chips", whereas in other embodiments, FIG. 9 may illustrate an exemplary System on a Chip ("SoC"). In at least one embodiment, devices may be interconnected with proprietary interconnects, standardized interconnects (e.g., PCIe) or some combination thereof. In at least one embodiment, one or more components of computer system 900 are interconnected using compute express link (CXL) interconnects.

Inference and/or training logic 715 are used to perform inferencing and/or training operations associated with one or more embodiments. Details regarding inference and/or training logic 715 are provided below in conjunction with FIGS. 7A and/or 7B. In at least one embodiment, inference and/or training logic 715 may be used in system FIG. 9 for inferencing or predicting operations based, at least in part, on weight parameters calculated using neural network training operations, neural network functions and/or architectures, or neural network use cases described herein.

Such components can be used for duplicate identification.

Figure 10:
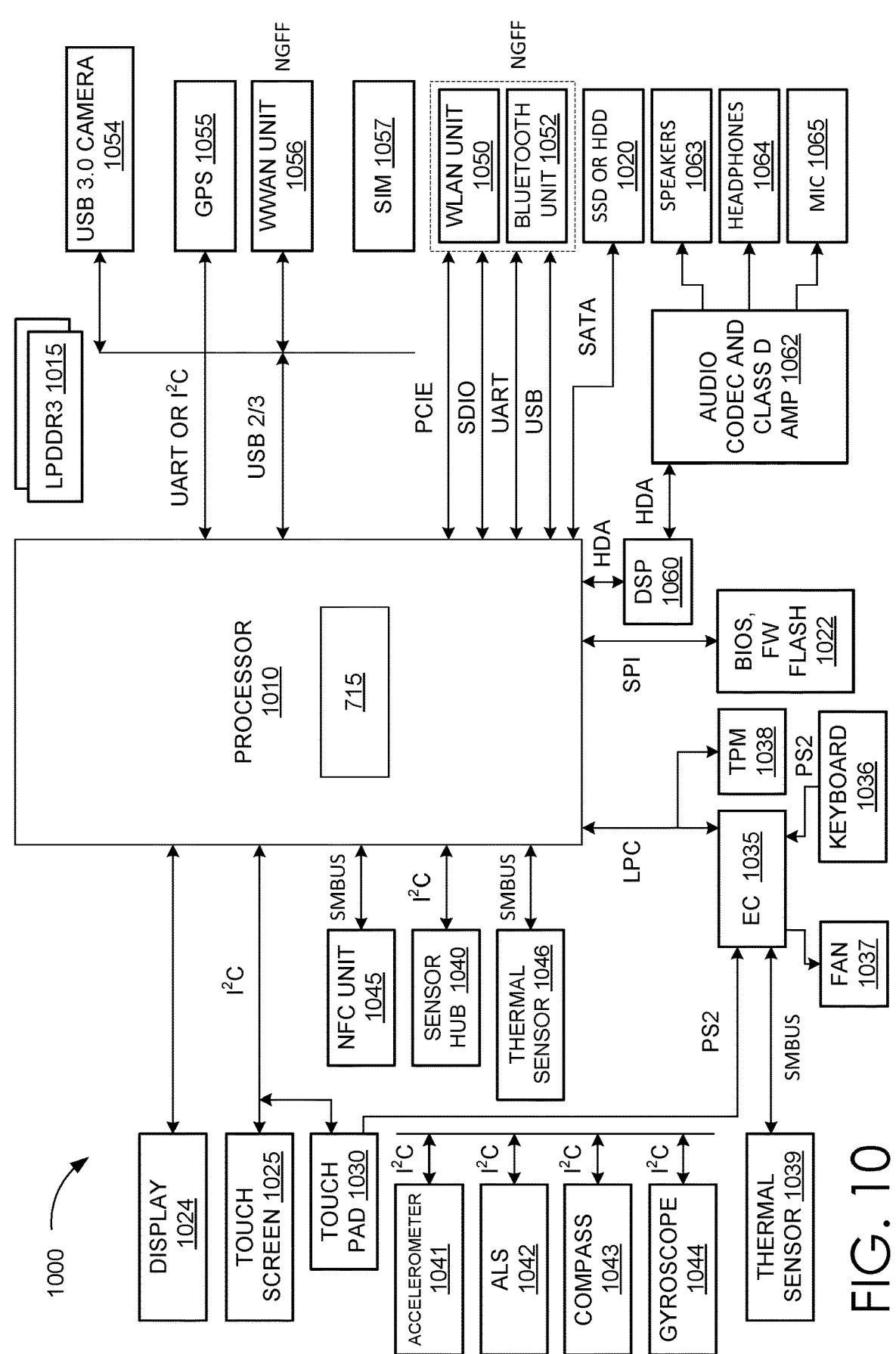
FIG. 10 illustrates a computer system, according to at least one embodiment.

FIG. 10 is a block diagram illustrating an electronic device 1000 for utilizing a processor 1010, according to at least one embodiment. In at least one embodiment, electronic device 1000 may be, for example and without limitation, a notebook, a tower server, a rack server, a blade server, a laptop, a desktop, a tablet, a mobile device, a phone, an embedded computer, or any other suitable electronic device.

In at least one embodiment, electronic device 1000 may include, without limitation, processor 1010 communicatively coupled to any suitable number or kind of components, peripherals, modules, or devices. In at least one embodiment, processor 1010 coupled using a bus or interface, such as a 1° C. bus, a System Management Bus ("SMBus"), a Low Pin Count (LPC) bus, a Serial Peripheral Interface ("SPI"), a High Definition Audio ("HDA") bus, a Serial Advance Technology Attachment ("SATA") bus, a Universal Serial Bus ("USB") (versions 1, 2, 3), or a Universal Asynchronous Receiver/Transmitter ("UART") bus. In at least one embodiment, FIG. 10 illustrates a system, which includes interconnected hardware devices or "chips", whereas in other embodiments, FIG. 10 may illustrate an exemplary System on a Chip ("SoC"). In at least one embodiment, devices illustrated in FIG. 10 may be interconnected with proprietary interconnects, standardized interconnects (e.g., PCIe) or some combination thereof. In at least one embodiment, one or more components of FIG. 10 are interconnected using compute express link (CXL) interconnects.

In at least one embodiment, FIG. 10 may include a display 1024, a touch screen 1025, a touch pad 1030, a Near Field Communications unit ("NFC") 1045, a sensor hub 1040, a thermal sensor 1046, an Express Chipset ("EC") 1035, a Trusted Platform Module ("TPM") 1038, BIOS/firmware/flash memory ("BIOS, FW Flash") 1022, a DSP 1060, a drive 1020 such as a Solid State Disk ("SSD") or a Hard Disk Drive ("HDD"), a wireless local area network unit ("WLAN") 1050, a Bluetooth unit 1052, a Wireless Wide Area Network unit ("WWAN") 1056, a Global Positioning System (GPS) 1055, a camera ("USB 3.0 camera") 1054 such as a USB 3.0 camera, and/or a Low Power Double Data Rate ("LPDDR") memory unit ("LPDDR3") 1015 implemented in, for example, LPDDR3 standard. These components may each be implemented in any suitable manner.

In at least one embodiment, other components may be communicatively coupled to processor 1010 through components discussed above. In at least one embodiment, an accelerometer 1041, Ambient Light Sensor ("ALS") 1042, compass 1043, and a gyroscope 1044 may be communicatively coupled to sensor hub 1040. In at least one embodiment, thermal sensor 1039, a fan 1037, a keyboard 1036, and a touch pad 1030 may be communicatively coupled to EC 1035. In at least one embodiment, speakers 1063, headphones 1064, and microphone ("mic") 1065 may be communicatively coupled to an audio unit ("audio codec and class d amp") 1062, which may in turn be communicatively coupled to DSP 1060. In at least one embodiment, audio unit 1062 may include, for example and without limitation, an audio coder/decoder ("codec") and a class D amplifier. In at least one embodiment, SIM card ("SIM") 1057 may be communicatively coupled to WWAN unit 1056. In at least one embodiment, components such as WLAN unit 1050 and Bluetooth unit 1052, as well as WWAN unit 1056 may be implemented in a Next Generation Form Factor ("NGFF").

Inference and/or training logic 715 are used to perform inferencing and/or training operations associated with one or more embodiments. Details regarding inference and/or training logic 715 are provided below in conjunction with FIGS. 7A and/or 7B. In at least one embodiment, inference and/or training logic 715 may be used in system FIG. 10 for inferencing or predicting operations based, at least in part, on weight parameters calculated using neural network training operations, neural network functions and/or architectures, or neural network use cases described herein.

Such components can be used for duplicate identification.

Figure 11:
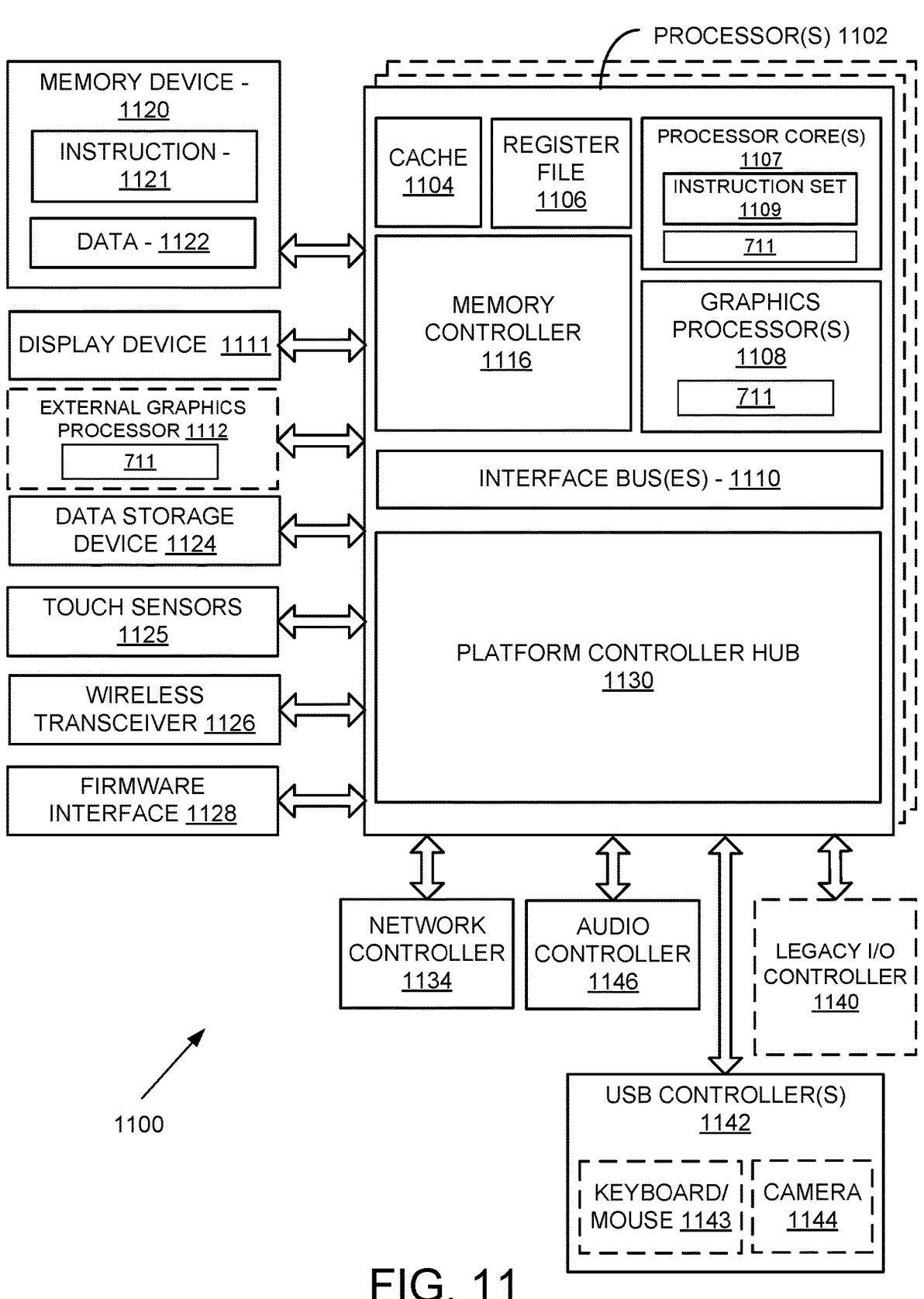
FIG. 11 illustrates at least portions of a graphics processor, according to one or more embodiments.

FIG. 11 is a block diagram of a processing system, according to at least one embodiment. In at least one embodiment, system 1100 includes one or more processor(s) 1102 and one or more graphics processor(s) 1108, and may be a single processor desktop system, a multiprocessor workstation system, or a server system having a large number of processor(s) 1102 or processor core(s) 1107. In at least one embodiment, system 1100 is a processing platform incorporated within a system-on-a-chip (SoC) integrated circuit for use in mobile, handheld, or embedded devices.

In at least one embodiment, system 1100 can include, or be incorporated within a server-based gaming platform, a game console, including a game and media console, a mobile gaming console, a handheld game console, or an online game console. In at least one embodiment, system 1100 is a mobile phone, smart phone, tablet computing device or mobile Internet device. In at least one embodiment, processing system 1100 can also include, coupled with, or be integrated within a wearable device, such as a smart watch wearable device, smart eyewear device, augmented reality device, or virtual reality device. In at least one embodiment, processing system 1100 is a television or set top box device having one or more processor(s) 1102 and a graphical interface generated by one or more graphics processor(s) 1108.

In at least one embodiment, one or more processor(s) 1102 each include one or more processor core(s) 1107 to process instructions which, when executed, perform operations for system and user software. In at least one embodiment, each of one or more processor core(s) 1107 is configured to process a specific instruction set 1109. In at least one embodiment, instruction set 1109 may facilitate Complex Instruction Set Computing (CISC), Reduced Instruction Set Computing (RISC), or computing via a Very Long Instruction Word (VLIW). In at least one embodiment, processor core(s) 1107 may each process a different instruction set 1109, which may include instructions to facilitate emulation of other instruction sets. In at least one embodiment, processor core(s) 1107 may also include other processing devices, such a Digital Signal Processor (DSP).

In at least one embodiment, processor(s) 1102 includes cache memory 1104. In at least one embodiment, processor(s) 1102 can have a single internal cache or multiple levels of internal cache. In at least one embodiment, cache memory is shared among various components of processor(s) 1102. In at least one embodiment, processor(s) 1102 also uses an external cache (e.g., a Level-3 (L3) cache or Last Level Cache (LLC)) (not shown), which may be shared among processor core(s) 1107 using known cache coherency techniques. In at least one embodiment, register file 1106 is additionally included in processor(s) 1102 which may include different types of registers for storing different types of data (e.g., integer registers, floating point registers, status registers, and an instruction pointer register). In at least one embodiment, register file 1106 may include general-purpose registers or other registers.

In at least one embodiment, one or more processor(s) 1102 are coupled with one or more interface bus(es) 1110 to transmit communication signals such as address, data, or control signals between processor(s) 1102 and other components in system 1100. In at least one embodiment, interface bus(es) 1110, in one embodiment, can be a processor bus, such as a version of a Direct Media Interface (DMI) bus. In at least one embodiment, interface bus(es) 1110 is not limited to a DMI bus, and may include one or more Peripheral Component Interconnect buses (e.g., PCI, PCI Express), memory busses, or other types of interface busses. In at least one embodiment processor(s) 1102 include an integrated memory controller 1116 and a platform controller hub 1130. In at least one embodiment, memory controller 1116 facilitates communication between a memory device and other components of system 1100, while platform controller hub (PCH) 1130 provides connections to I/O devices via a local I/O bus.

In at least one embodiment, memory device 1120 can be a dynamic random access memory (DRAM) device, a static random access memory (SRAM) device, flash memory device, phase-change memory device, or some other memory device having suitable performance to serve as process memory. In at least one embodiment memory device 1120 can operate as system memory for system 1100, to store data 1122 and instruction 1121 for use when one or more processor(s) 1102 executes an application or process. In at least one embodiment, memory controller 1116 also couples with an optional external graphics processor 1112, which may communicate with one or more graphics processor(s) 1108 in processor(s) 1102 to perform graphics and media operations. In at least one embodiment, a display device 1111 can connect to processor(s) 1102. In at least one embodiment display device 1111 can include one or more of an internal display device, as in a mobile electronic device or a laptop device or an external display device attached via a display interface (e.g., DisplayPort, etc.). In at least one embodiment, display device 1111 can include a head mounted display (HMD) such as a stereoscopic display device for use in virtual reality (VR) applications or augmented reality (AR) applications.

In at least one embodiment, platform controller hub 1130 enables peripherals to connect to memory device 1120 and processor(s) 1102 via a high-speed I/O bus. In at least one embodiment, I/O peripherals include, but are not limited to, an audio controller 1146, a network controller 1134, a firmware interface 1128, a wireless transceiver 1126, touch sensors 1125, a data storage device 1124 (e.g., hard disk drive, flash memory, etc.). In at least one embodiment, data storage device 1124 can connect via a storage interface (e.g., SATA) or via a peripheral bus, such as a Peripheral Component Interconnect bus (e.g., PCI, PCI Express). In at least one embodiment, touch sensors 1125 can include touch screen sensors, pressure sensors, or fingerprint sensors. In at least one embodiment, wireless transceiver 1126 can be a Wi-Fi transceiver, a Bluetooth transceiver, or a mobile network transceiver such as a 3G, 4G, or Long Term Evolution (LTE) transceiver. In at least one embodiment, firmware interface 1128 enables communication with system firmware, and can be, for example, a unified extensible firmware interface (UEFI). In at least one embodiment, network controller 1134 can enable a network connection to a wired network. In at least one embodiment, a high-performance network controller (not shown) couples with interface bus(es) 1110. In at least one embodiment, audio controller 1146 is a multi-channel high definition audio controller. In at least one embodiment, system 1100 includes an optional legacy I/O controller 1140 for coupling legacy (e.g., Personal System 2 (PS/2)) devices to system. In at least one embodiment, platform controller hub 1130 can also connect to one or more Universal Serial Bus (USB) controller(s) 1142 connect input devices, such as keyboard and mouse 1143 combinations, a camera 1144, or other USB input devices.

In at least one embodiment, an instance of memory controller 1116 and platform controller hub 1130 may be integrated into a discreet external graphics processor, such as external graphics processor 1112. In at least one embodiment, platform controller hub 1130 and/or memory controller 1116 may be external to one or more processor(s) 1102. For example, in at least one embodiment, system 1100 can include an external memory controller 1116 and platform controller hub 1130, which may be configured as a memory controller hub and peripheral controller hub within a system chipset that is in communication with processor(s) 1102.

Inference and/or training logic 715 are used to perform inferencing and/or training operations associated with one or more embodiments. Details regarding inference and/or training logic 715 are provided below in conjunction with FIGS. 7A and/or 7B. In at least one embodiment portions or all of inference and/or training logic 715 may be incorporated into graphics processor 1500. For example, in at least one embodiment, training and/or inferencing techniques described herein may use one or more of ALUs embodied in a graphics processor. Moreover, in at least one embodiment, inferencing and/or training operations described herein may be done using logic other than logic illustrated in FIGS. 7A and/or 7B. In at least one embodiment, weight parameters may be stored in on-chip or off-chip memory and/or registers (shown or not shown) that configure ALUs of a graphics processor to perform one or more machine learning algorithms, neural network architectures, use cases, or training techniques described herein.

Such components can be used for duplicate identification.

Figure 12:
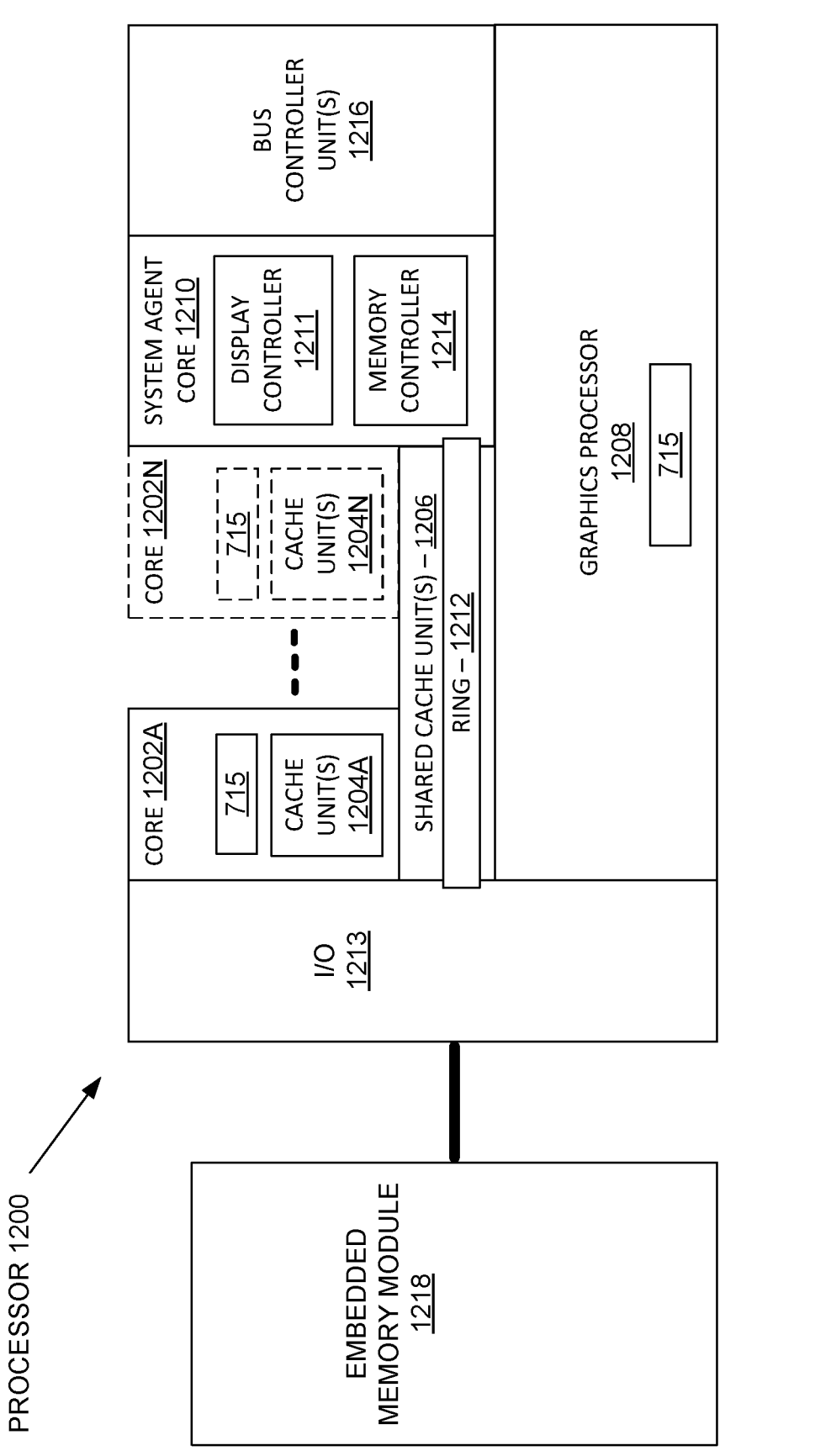
FIG. 12 illustrates at least portions of a graphics processor, according to one or more embodiments.

FIG. 12 is a block diagram of a processor 1200 having one or more processor core(s) 1202A-1202N, an integrated memory controller 1214, and an integrated graphics processor 1208, according to at least one embodiment. In at least one embodiment, processor 1200 can include additional cores up to and including additional core 1202N represented by dashed lined boxes. In at least one embodiment, each of processor core(s) 1202A-1202N includes one or more internal cache unit(s) 1204A-1204N. In at least one embodiment, each processor core also has access to one or more shared cached unit(s) 1206.

In at least one embodiment, internal cache unit(s) 1204A-1204N and shared cache unit(s) 1206 represent a cache memory hierarchy within processor 1200. In at least one embodiment, cache unit(s) 1204A-1204N may include at least one level of instruction and data cache within each processor core and one or more levels of shared mid-level cache, such as a Level 2 (L2), Level 3 (L3), Level 4 (L4), or other levels of cache, where a highest level of cache before external memory is classified as an LLC. In at least one embodiment, cache coherency logic maintains coherency between various cache unit(s) 1206 and 1204A-1204N.

In at least one embodiment, processor 1200 may also include a set of one or more bus controller unit(s) 1216 and a system agent core 1210. In at least one embodiment, one or more bus controller unit(s) 1216 manage a set of peripheral buses, such as one or more PCI or PCI express busses. In at least one embodiment, system agent core 1210 provides management functionality for various processor components. In at least one embodiment, system agent core 1210 includes one or more integrated memory controllers 1214 to manage access to various external memory devices (not shown).

In at least one embodiment, one or more of processor core(s) 1202A-1202N include support for simultaneous multi-threading. In at least one embodiment, system agent core 1210 includes components for coordinating and operating processor core(s) 1202A-1202N during multi-threaded processing. In at least one embodiment, system agent core 1210 may additionally include a power control unit (PCU), which includes logic and components to regulate one or more power states of processor core(s) 1202A-1202N and graphics processor 1208.

In at least one embodiment, processor 1200 additionally includes graphics processor 1208 to execute graphics processing operations. In at least one embodiment, graphics processor 1208 couples with shared cache unit(s) 1206, and system agent core 1210, including one or more integrated memory controllers 1214. In at least one embodiment, system agent core 1210 also includes a display controller 1211 to drive graphics processor output to one or more coupled displays. In at least one embodiment, display controller 1211 may also be a separate module coupled with graphics processor 1208 via at least one interconnect, or may be integrated within graphics processor 1208.

In at least one embodiment, a ring based interconnect unit 1212 is used to couple internal components of processor 1200. In at least one embodiment, an alternative interconnect unit may be used, such as a point-to-point interconnect, a switched interconnect, or other techniques. In at least one embodiment, graphics processor 1208 couples with ring based interconnect unit 1212 via an I/O link 1213.

In at least one embodiment, I/O link 1213 represents at least one of multiple varieties of I/O interconnects, including an on package I/O interconnect which facilitates communication between various processor components and a high-performance embedded memory module 1218, such as an eDRAM module. In at least one embodiment, each of processor core(s) 1202A-1202N and graphics processor 1208 use embedded memory modules 1218 as a shared Last Level Cache.

In at least one embodiment, processor core(s) 1202A-1202N are homogenous cores executing a common instruction set architecture. In at least one embodiment, processor core(s) 1202A-1202N are heterogeneous in terms of instruction set architecture (ISA), where one or more of processor core(s) 1202A-1202N execute a common instruction set, while one or more other cores of processor core(s) 1202A-1202N executes a subset of a common instruction set or a different instruction set. In at least one embodiment, processor core(s) 1202A-1202N are heterogeneous in terms of microarchitecture, where one or more cores having a relatively higher power consumption couple with one or more power cores having a lower power consumption. In at least one embodiment, processor 1200 can be implemented on one or more chips or as an SoC integrated circuit.

Inference and/or training logic 715 are used to perform inferencing and/or training operations associated with one or more embodiments. Details regarding inference and/or training logic 715 are provided below in conjunction with FIGS. 7A and/or 7B. In at least one embodiment portions or all of inference and/or training logic 715 may be incorporated into processor 1200. For example, in at least one embodiment, training and/or inferencing techniques described herein may use one or more of ALUs embodied in graphics processor 1208, processor core(s) 1202A-1202N, or other components in FIG. 12. Moreover, in at least one embodiment, inferencing and/or training operations described herein may be done using logic other than logic illustrated in FIGS. 7A and/or 7B. In at least one embodiment, weight parameters may be stored in on-chip or off-chip memory and/or registers (shown or not shown) that configure ALUs of graphics processor 1200 to perform one or more machine learning algorithms, neural network architectures, use cases, or training techniques described herein.

Such components can be used for duplicate identification.

Virtualized Computing Platform

Figure 13:
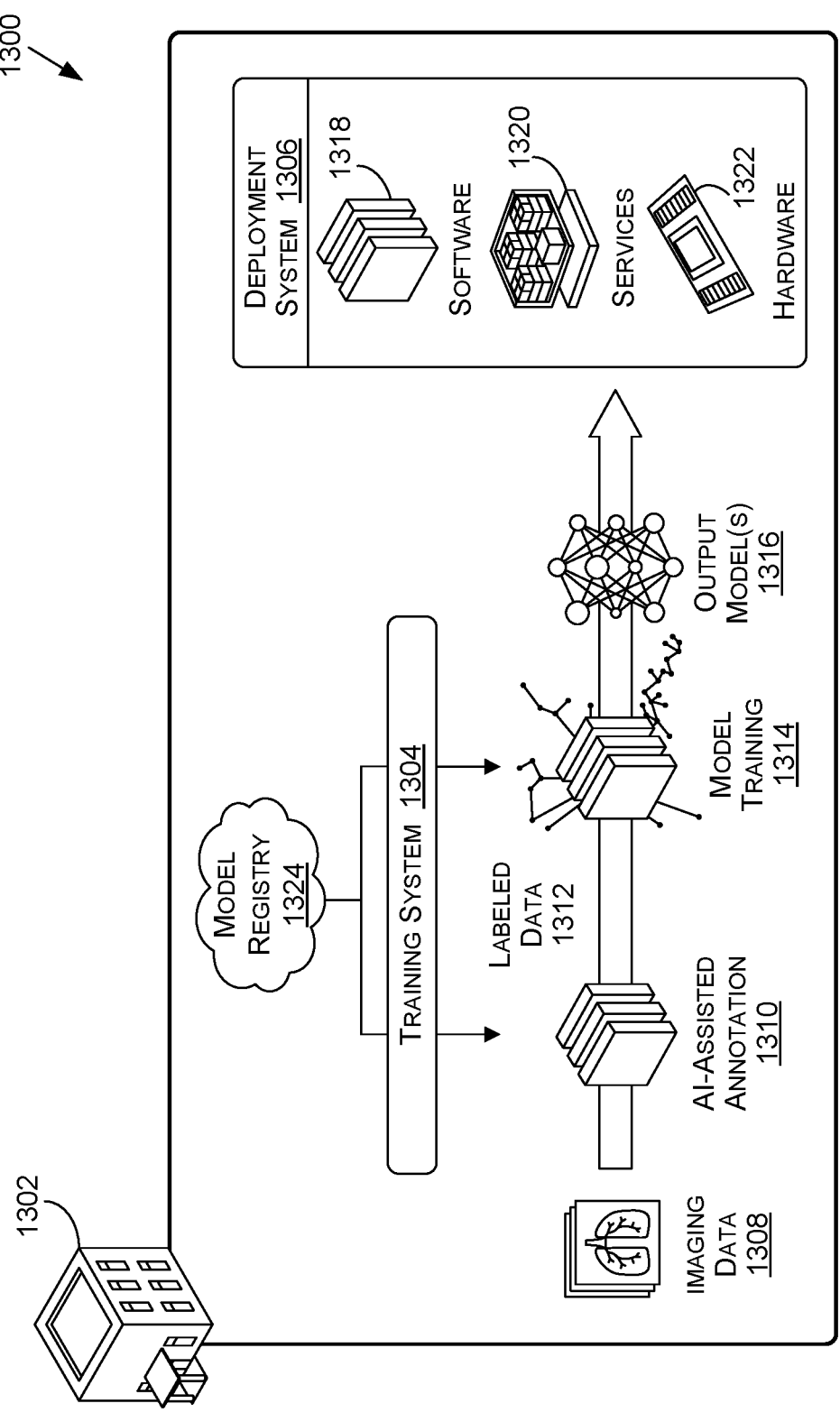
FIG. 13 is an example data flow diagram for an advanced computing pipeline, in accordance with at least one embodiment.

FIG. 13 is an example data flow diagram for a process 1300 of generating and deploying an image processing and inferencing pipeline, in accordance with at least one embodiment. In at least one embodiment, process 1300 may be deployed for use with imaging devices, processing devices, and/or other device types at one or more facilities 1302. Process 1300 may be executed within a training system 1304 and/or a deployment system 1306. In at least one embodiment, training system 1304 may be used to perform training, deployment, and implementation of machine learning models (e.g., neural networks, object detection algorithms, computer vision algorithms, etc.) for use in deployment system 1306. In at least one embodiment, deployment system 1306 may be configured to offload processing and compute resources among a distributed computing environment to reduce infrastructure requirements at facility 1302. In at least one embodiment, one or more applications in a pipeline may use or call upon services (e.g., inference, visualization, compute, AI, etc.) of deployment system 1306 during execution of applications.

In at least one embodiment, some of applications used in advanced processing and inferencing pipelines may use machine learning models or other AI to perform one or more processing steps. In at least one embodiment, machine learning models may be trained at facility 1302 using data 1308 (such as imaging data) generated at facility 1302 (and stored on one or more picture archiving and communication system (PACS) servers at facility 1302), may be trained using imaging or sequencing data 1308 from another facility (ies), or a combination thereof. In at least one embodiment, training system 1304 may be used to provide applications, services, and/or other resources for generating working, deployable machine learning models for deployment system 1306.

In at least one embodiment, model registry 1324 may be backed by object storage that may support versioning and object metadata. In at least one embodiment, object storage may be accessible through, for example, a cloud storage compatible application programming interface (API) from within a cloud platform. In at least one embodiment, machine learning models within model registry 1324 may uploaded, listed, modified, or deleted by developers or partners of a system interacting with an API. In at least one embodiment, an API may provide access to methods that allow users with appropriate credentials to associate models with applications, such that models may be executed as part of execution of containerized instantiations of applications.

In at least one embodiment, training system 1304 (FIG. 13) may include a scenario where facility 1302 is training their own machine learning model, or has an existing machine learning model that needs to be optimized or updated. In at least one embodiment, imaging data 1308 generated by imaging device(s), sequencing devices, and/or other device types may be received. In at least one embodiment, once imaging data 1308 is received, AI-assisted annotation 1310 may be used to aid in generating annotations corresponding to imaging data 1308 to be used as ground truth data for a machine learning model. In at least one embodiment, AI-assisted annotation 1310 may include one or more machine learning models (e.g., convolutional neural networks (CNNs)) that may be trained to generate annotations corresponding to certain types of imaging data 1308 (e.g., from certain devices). In at least one embodiment, AI-assisted annotation 1310 may then be used directly, or may be adjusted or fine-tuned using an annotation tool to generate ground truth data. In at least one embodiment, AI-assisted annotation 1310, labeled data 1312, or a combination thereof may be used as ground truth data for training a machine learning model. In at least one embodiment, a trained machine learning model may be referred to as output model(s) 1316, and may be used by deployment system 1306, as described herein.

In at least one embodiment, a training pipeline may include a scenario where facility 1302 needs a machine learning model for use in performing one or more processing tasks for one or more applications in deployment system 1306, but facility 1302 may not currently have such a machine learning model (or may not have a model that is optimized, efficient, or effective for such purposes). In at least one embodiment, an existing machine learning model may be selected from a model registry 1324. In at least one embodiment, model registry 1324 may include machine learning models trained to perform a variety of different inference tasks on imaging data. In at least one embodiment, machine learning models in model registry 1324 may have been trained on imaging data from different facilities than facility 1302 (e.g., facilities remotely located). In at least one embodiment, machine learning models may have been trained on imaging data from one location, two locations, or any number of locations. In at least one embodiment, when being trained on imaging data from a specific location, training may take place at that location, or at least in a manner that protects confidentiality of imaging data or restricts imaging data from being transferred off-premises. In at least one embodiment, once a model is trained—or partially trained—at one location, a machine learning model may be added to model registry 1324. In at least one embodiment, a machine learning model may then be retrained, or updated, at any number of other facilities, and a retrained or updated model may be made available in model registry 1324. In at least one embodiment, a machine learning model may then be selected from model registry 1324—and referred to as output model(s) 1316—and may be used in deployment system 1306 to perform one or more processing tasks for one or more applications of a deployment system.

In at least one embodiment, a scenario may include facility 1302 requiring a machine learning model for use in performing one or more processing tasks for one or more applications in deployment system 1306, but facility 1302 may not currently have such a machine learning model (or may not have a model that is optimized, efficient, or effective for such purposes). In at least one embodiment, a machine learning model selected from model registry 1324 may not be fine-tuned or optimized for imaging data 1308 generated at facility 1302 because of differences in populations, robustness of training data used to train a machine learning model, diversity in anomalies of training data, and/or other issues with training data. In at least one embodiment, AI-assisted annotation 1310 may be used to aid in generating annotations corresponding to imaging data 1308 to be used as ground truth data for retraining or updating a machine learning model. In at least one embodiment, labeled data 1312 may be used as ground truth data for training a machine learning model. In at least one embodiment, retraining or updating a machine learning model may be referred to as model training 1314. In at least one embodiment, model training 1314—e.g., AI-assisted annotation 1310, labeled data 1312, or a combination thereof—may be used as ground truth data for retraining or updating a machine learning model. In at least one embodiment, a trained machine learning model may be referred to as output model(s) 1316, and may be used by deployment system 1306, as described herein.

In at least one embodiment, deployment system 1306 may include software 1318, services 1320, hardware 1322, and/ or other components, features, and functionality. In at least one embodiment, deployment system 1306 may include a software "stack," such that software 1318 may be built on top of services 1320 and may use services 1320 to perform some or all of processing tasks, and services 1320 and software 1318 may be built on top of hardware 1322 and use hardware 1322 to execute processing, storage, and/or other compute tasks of deployment system 1306. In at least one embodiment, software 1318 may include any number of different containers, where each container may execute an instantiation of an application. In at least one embodiment, each application may perform one or more processing tasks in an advanced processing and inferencing pipeline (e.g., inferencing, object detection, feature detection, segmentation, image enhancement, calibration, etc.). In at least one embodiment, an advanced processing and inferencing pipeline may be defined based on selections of different containers that are desired or required for processing imaging data 1308, in addition to containers that receive and configure imaging data for use by each container and/or for use by facility 1302 after processing through a pipeline (e.g., to convert outputs back to a usable data type). In at least one embodiment, a combination of containers within software 1318 (e.g., that make up a pipeline) may be referred to as a virtual instrument (as described in more detail herein), and a virtual instrument may leverage services 1320 and hardware 1322 to execute some or all processing tasks of applications instantiated in containers.

In at least one embodiment, a data processing pipeline may receive input data (e.g., imaging data 1308) in a specific format in response to an inference request (e.g., a request from a user of deployment system 1306). In at least one embodiment, input data may be representative of one or more images, video, and/or other data representations generated by one or more imaging devices. In at least one embodiment, data may undergo pre-processing as part of data processing pipeline to prepare data for processing by one or more applications. In at least one embodiment, post-processing may be performed on an output of one or more inferencing tasks or other processing tasks of a pipe-line to prepare an output data for a next application and/or to prepare output data for transmission and/or use by a user (e.g., as a response to an inference request). In at least one embodiment, inferencing tasks may be performed by one or more machine learning models, such as trained or deployed neural networks, which may include output model(s) 1316 of training system 1304.

In at least one embodiment, tasks of data processing pipeline may be encapsulated in a container(s) that each represents a discrete, fully functional instantiation of an application and virtualized computing environment that is able to reference machine learning models. In at least one embodiment, containers or applications may be published into a private (e.g., limited access) area of a container registry (described in more detail herein), and trained or deployed models may be stored in model registry 1324 and associated with one or more applications. In at least one embodiment, images of applications (e.g., container images) may be available in a container registry, and once selected by a user from a container registry for deployment in a pipeline, an image may be used to generate a container for an instantiation of an application for use by a user's system.

In at least one embodiment, developers (e.g., software developers, clinicians, doctors, etc.) may develop, publish, and store applications (e.g., as containers) for performing image processing and/or inferencing on supplied data. In at least one embodiment, development, publishing, and/or storing may be performed using a software development kit (SDK) associated with a system (e.g., to ensure that an application and/or container developed is compliant with or compatible with a system). In at least one embodiment, an application that is developed may be tested locally (e.g., at a first facility, on data from a first facility) with an SDK which may support at least some of services 1320 as a system (e.g., processor 1200 of FIG. 12). In at least one embodiment, because DICOM objects may contain anywhere from one to hundreds of images or other data types, and due to a variation in data, a developer may be responsible for managing (e.g., setting constructs for, building pre-processing into an application, etc.) extraction and preparation of incoming data. In at least one embodiment, once validated by process 1300 (e.g., for accuracy), an application may be available in a container registry for selection and/or implementation by a user to perform one or more processing tasks with respect to data at a facility (e.g., a second facility) of a user.

In at least one embodiment, developers may then share applications or containers through a network for access and use by users of a system (e.g., process 1300 of FIG. 13). In at least one embodiment, completed and validated applications or containers may be stored in a container registry and associated machine learning models may be stored in model registry 1324. In at least one embodiment, a requesting entity—who provides an inference or image processing request—may browse a container registry and/or model registry 1324 for an application, container, dataset, machine learning model, etc., select a desired combination of elements for inclusion in data processing pipeline, and submit an imaging processing request. In at least one embodiment, a request may include input data (and associated patient data, in some examples) that is necessary to perform a request, and/or may include a selection of application(s) and/or machine learning models to be executed in processing a request. In at least one embodiment, a request may then be passed to one or more components of deployment system 1306 (e.g., a cloud) to perform processing of data processing pipeline. In at least one embodiment, processing by deployment system 1306 may include referencing selected elements (e.g., applications, containers, models, etc.) from a container registry and/or model registry 1324. In at least one embodiment, once results are generated by a pipeline, results may be returned to a user for reference (e.g., for viewing in a viewing application suite executing on a local, on-premises workstation or terminal).

In at least one embodiment, to aid in processing or execution of applications or containers in pipelines, services 1320 may be leveraged. In at least one embodiment, services 1320 may include compute services, artificial intelligence (AI) services, visualization services, and/or other service types. In at least one embodiment, services 1320 may provide functionality that is common to one or more applications in software 1318, so functionality may be abstracted to a service that may be called upon or leveraged by applications. In at least one embodiment, functionality provided by services 1320 may run dynamically and more efficiently, while also scaling well by allowing applications to process data in parallel (e.g., using a parallel computing platform 1230 (FIG. 12)). In at least one embodiment, rather than each application that shares a same functionality offered by services 1320 being required to have a respective instance of services 1320, services 1320 may be shared between and among various applications. In at least one embodiment, services may include an inference server or engine that may be used for executing detection or segmentation tasks, as non-limiting examples. In at least one embodiment, a model training service may be included that may provide machine learning model training and/or retraining capabilities. In at least one embodiment, a data augmentation service may further be included that may provide GPU accelerated data (e.g., DICOM, RIS, CIS, REST compliant, RPC, raw, etc.) extraction, resizing, scaling, and/or other augmentation. In at least one embodiment, a visualization service may be used that may add image rendering effects—such as ray-tracing, rasterization, denoising, sharpening, etc.—to add realism to two-dimensional (2D) and/or three-dimensional (3D) models. In at least one embodiment, virtual instrument services may be included that provide for beam-forming, segmentation, inferencing, imaging, and/or support for other applications within pipelines of virtual instruments.

In at least one embodiment, where services 1320 includes an AI service (e.g., an inference service), one or more machine learning models may be executed by calling upon (e.g., as an API call) an inference service (e.g., an inference server) to execute machine learning model(s), or processing thereof, as part of application execution. In at least one embodiment, where another application includes one or more machine learning models for segmentation tasks, an application may call upon an inference service to execute machine learning models for performing one or more of processing operations associated with segmentation tasks. In at least one embodiment, software 1318 implementing advanced processing and inferencing pipeline that includes segmentation application and anomaly detection application may be streamlined because each application may call upon a same inference service to perform one or more inferencing tasks.

In at least one embodiment, hardware 1322 may include GPUs, CPUs, graphics cards, an AI/deep learning system (e.g., an AI supercomputer, such as NVIDIA's DGX), a cloud platform, or a combination thereof. In at least one embodiment, different types of hardware 1322 may be used to provide efficient, purpose-built support for software 1318 and services 1320 in deployment system 1306. In at least one embodiment, use of GPU processing may be implemented for processing locally (e.g., at facility 1302), within an AI/deep learning system, in a cloud system, and/or in other processing components of deployment system 1306 to improve efficiency, accuracy, and efficacy of image processing and generation. In at least one embodiment, software 1318 and/or services 1320 may be optimized for GPU processing with respect to deep learning, machine learning, and/or high-performance computing, as non-limiting examples. In at least one embodiment, at least some of computing environment of deployment system 1306 and/or training system 1304 may be executed in a datacenter one or more supercomputers or high performance computing systems, with GPU optimized software (e.g., hardware and software combination of NVIDIA's DGX System). In at least one embodiment, hardware 1322 may include any number of GPUs that may be called upon to perform processing of data in parallel, as described herein. In at least one embodiment, cloud platform may further include GPU processing for GPU-optimized execution of deep learning tasks, machine learning tasks, or other computing tasks. In at least one embodiment, cloud platform (e.g., NVIDIA's NGC) may be executed using an AI/deep learning supercomputer(s) and/or GPU-optimized software (e.g., as provided on NVIDIA's DGX Systems) as a hardware abstraction and scaling platform. In at least one embodiment, cloud platform may integrate an application container clustering system or orchestration system (e.g., KUBERNETES) on multiple GPUs to enable seamless scaling and load balancing.

Figure 14:
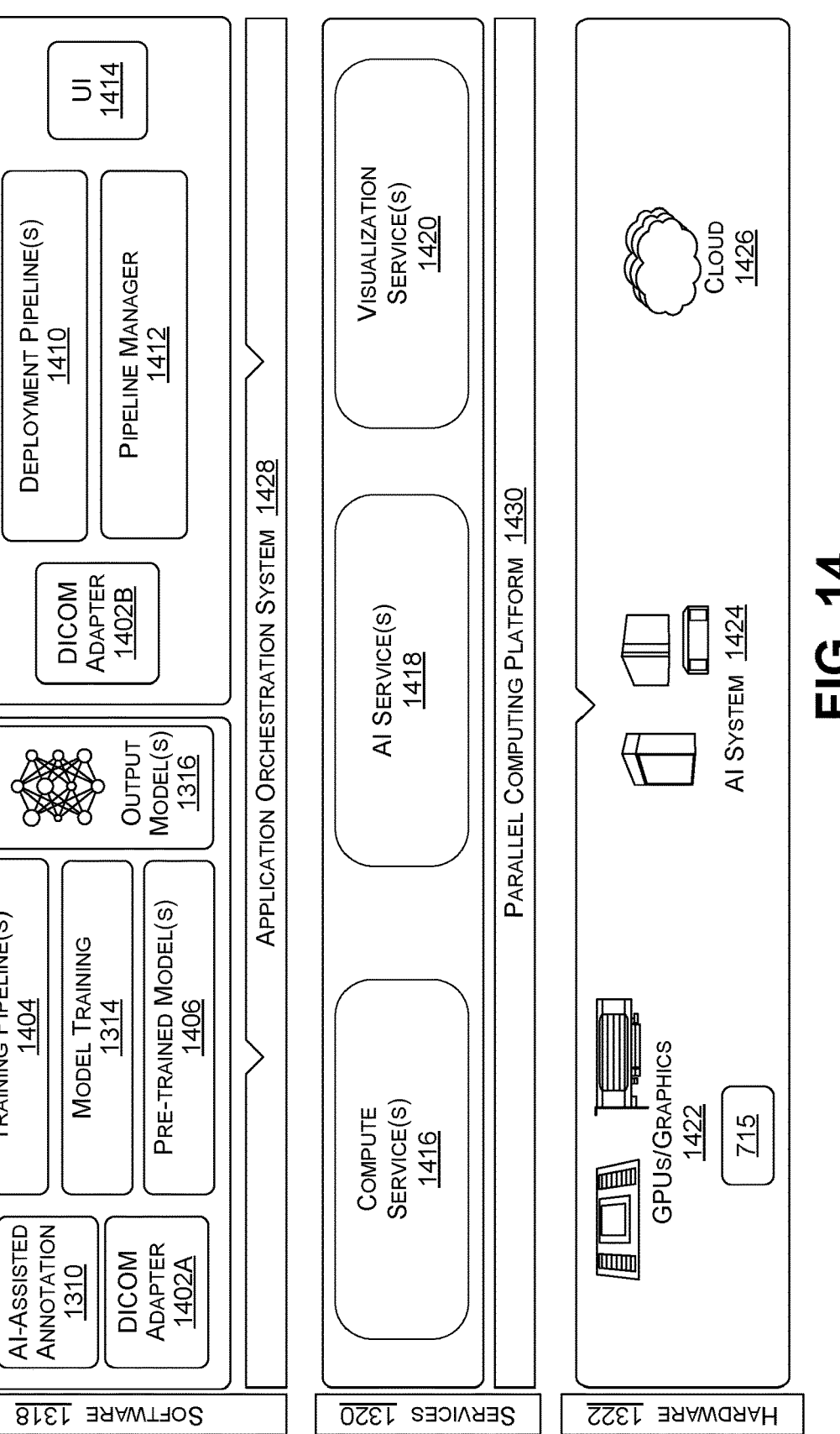
FIG. 14 is a system diagram for an example system for training, adapting, instantiating and deploying machine learning models in an advanced computing pipeline, in accordance with at least one embodiment.

FIG. 14 is a system diagram for an example system 1400 for generating and deploying an imaging deployment pipeline, in accordance with at least one embodiment. In at least one embodiment, system 1400 may be used to implement process 1300 of FIG. 13 and/or other processes including advanced processing and inferencing pipelines. In at least one embodiment, system 1400 may include training system 1304 and deployment system 1306. In at least one embodiment, training system 1304 and deployment system 1306 may be implemented using software 1318, services 1320, and/or hardware 1322, as described herein.

In at least one embodiment, system 1400 (e.g., training system 1304 and/or deployment system 1306) may implemented in a cloud computing environment (e.g., using cloud 1426). In at least one embodiment, system 1400 may be implemented locally with respect to a healthcare services facility, or as a combination of both cloud and local computing resources. In at least one embodiment, access to APIs in cloud 1426 may be restricted to authorized users through enacted security measures or protocols. In at least one embodiment, a security protocol may include web tokens that may be signed by an authentication (e.g., AuthN, AuthZ, Gluecon, etc.) service and may carry appropriate authorization. In at least one embodiment, APIs of virtual instruments (described herein), or other instantiations of system 1400, may be restricted to a set of public IPs that have been vetted or authorized for interaction.

In at least one embodiment, various components of system 1400 may communicate between and among one another using any of a variety of different network types, including but not limited to local area networks (LANs) and/or wide area networks (WANs) via wired and/or wireless communication protocols. In at least one embodiment, communication between facilities and components of system 1400 (e.g., for transmitting inference requests, for receiving results of inference requests, etc.) may be communicated over data bus(ses), wireless data protocols (Wi-Fi), wired data protocols (e.g., Ethernet), etc.

In at least one embodiment, training system 1304 may execute training pipeline(s) 1404, similar to those described herein with respect to FIG. 13. In at least one embodiment, where one or more machine learning models are to be used in deployment pipeline(s) 1410 by deployment system 1306, training pipeline(s) 1404 may be used to train or retrain one or more (e.g. pre-trained) models, and/or implement one or more of pre-trained model(s) 1406 (e.g., without a need for retraining or updating). In at least one embodiment, as a result of training pipeline(s) 1404, output model(s) 1316 may be generated. In at least one embodiment, training pipeline(s) 1404 may include any number of processing steps, such as but not limited to imaging data (or other input data) conversion or adaption In at least one embodiment, for different machine learning models used by deployment system 1306, different training pipeline(s) 1404 may be used. In at least one embodiment, training pipeline(s) 1404 similar to a first example described with respect to FIG. 13 may be used for a first machine learning model, training pipeline(s) 1404 similar to a second example described with respect to FIG. 13 may be used for a second machine learning model, and training pipeline(s) 1404 similar to a third example described with respect to FIG. 13 may be used for a third machine learning model. In at least one embodiment, any combination of tasks within training system 1304 may be used depending on what is required for each respective machine learning model. In at least one embodiment, one or more of machine learning models may already be trained and ready for deployment so machine learning models may not undergo any processing by training system 1304, and may be implemented by deployment system 1306.

In at least one embodiment, output model(s) 1316 and/or pre-trained model(s) 1406 may include any types of machine learning models depending on implementation or embodiment. In at least one embodiment, and without limitation, machine learning models used by system 1400 may include machine learning model(s) using linear regression, logistic regression, decision trees, support vector machines (SVM), Naïve Bayes, k-nearest neighbor (Knn), K means clustering, random forest, dimensionality reduction algorithms, gradient boosting algorithms, neural networks (e.g., auto-encoders, convolutional, recurrent, perceptrons, Long/Short Term Memory (LSTM), Hopfield, Boltzmann, deep belief, deconvolutional, generative adversarial, liquid state machine, etc.), and/or other types of machine learning models.

In at least one embodiment, training pipeline(s) 1404 may include AI-assisted annotation, as described in more detail herein with respect to at least FIG. 14. In at least one embodiment, labeled data 1312 (e.g., traditional annotation) may be generated by any number of techniques. In at least one embodiment, labels or other annotations may be generated within a drawing program (e.g., an annotation program), a computer aided design (CAD) program, a labeling program, another type of program suitable for generating annotations or labels for ground truth, and/or may be hand drawn, in some examples. In at least one embodiment, ground truth data may be synthetically produced (e.g., generated from computer models or renderings), real produced (e.g., designed and produced from real-world data), machine-automated (e.g., using feature analysis and learning to extract features from data and then generate labels), human annotated (e.g., labeler, or annotation expert, defines location of labels), and/or a combination thereof. In at least one embodiment, for each instance of imaging data 1308 (or other data type used by machine learning models), there may be corresponding ground truth data generated by training system 1304. In at least one embodiment, AI-assisted annotation may be performed as part of deployment pipeline(s) 1410; either in addition to, or in lieu of AI-assisted annotation included in training pipeline(s) 1404. In at least one embodiment, system 1400 may include a multi-layer platform that may include a software layer (e.g., software 1318) of diagnostic applications (or other application types) that may perform one or more medical imaging and diagnostic functions. In at least one embodiment, system 1400 may be communicatively coupled to (e.g., via encrypted links) PACS server networks of one or more facilities. In at least one embodiment, system 1400 may be configured to access and referenced data from PACS servers to perform operations, such as training machine learning models, deploying machine learning models, image processing, inferencing, and/or other operations.

In at least one embodiment, a software layer may be implemented as a secure, encrypted, and/or authenticated API through which applications or containers may be invoked (e.g., called) from an external environment(s) (e.g., facility 1302). In at least one embodiment, applications may then call or execute one or more services 1320 for performing compute, AI, or visualization tasks associated with respective applications, and software 1318 and/or services 1320 may leverage hardware 1322 to perform processing tasks in an effective and efficient manner. In at least one embodiment, communications sent to, or received by, a training system 1304 and a deployment system 1306 may occur using a pair of DICOM adapters 1402A, 1402B.

In at least one embodiment, deployment system 1306 may execute deployment pipeline(s) 1410. In at least one embodiment, deployment pipeline(s) 1410 may include any number of applications that may be sequentially, non-sequentially, or otherwise applied to imaging data (and/or other data types) generated by imaging devices, sequencing devices, genomics devices, etc.—including AI-assisted annotation, as described above. In at least one embodiment, as described herein, deployment pipeline(s) 1410 for an individual device may be referred to as a virtual instrument for a device (e.g., a virtual ultrasound instrument, a virtual CT scan instrument, a virtual sequencing instrument, etc.). In at least one embodiment, for a single device, there may be more than one deployment pipeline(s) 1410 depending on information desired from data generated by a device. In at least one embodiment, where detections of anomalies are desired from an MM machine, there may be a first deployment pipeline(s) 1410, and where image enhancement is desired from output of an MRI machine, there may be a second deployment pipeline(s) 1410.

In at least one embodiment, an image generation application may include a processing task that includes use of a machine learning model. In at least one embodiment, a user may desire to use their own machine learning model, or to select a machine learning model from model registry 1324. In at least one embodiment, a user may implement their own machine learning model or select a machine learning model for inclusion in an application for performing a processing task. In at least one embodiment, applications may be selectable and customizable, and by defining constructs of applications, deployment and implementation of applications for a particular user are presented as a more seamless user experience. In at least one embodiment, by leveraging other features of system 1400—such as services 1320 and hardware 1322—deployment pipeline(s) 1410 may be even more user friendly, provide for easier integration, and produce more accurate, efficient, and timely results.

In at least one embodiment, deployment system 1306 may include a user interface ("UI") 1414 (e.g., a graphical user interface, a web interface, etc.) that may be used to select applications for inclusion in deployment pipeline(s) 1410, arrange applications, modify or change applications or parameters or constructs thereof, use and interact with deployment pipeline(s) 1410 during set-up and/or deployment, and/or to otherwise interact with deployment system 1306. In at least one embodiment, although not illustrated with respect to training system 1304, UI 1414 (or a different user interface) may be used for selecting models for use in deployment system 1306, for selecting models for training, or retraining, in training system 1304, and/or for otherwise interacting with training system 1304.

In at least one embodiment, pipeline manager 1412 may be used, in addition to an application orchestration system 1428, to manage interaction between applications or containers of deployment pipeline(s) 1410 and services 1320 and/or hardware 1322. In at least one embodiment, pipeline manager 1412 may be configured to facilitate interactions from application to application, from application to services 1320, and/or from application or service to hardware 1322. In at least one embodiment, although illustrated as included in software 1318, this is not intended to be limiting, and in some examples pipeline manager 1412 may be included in services 1320. In at least one embodiment, application orchestration system 1428 (e.g., Kubernetes, DOCKER, etc.) may include a container orchestration system that may group applications into containers as logical units for coordination, management, scaling, and deployment. In at least one embodiment, by associating applications from deployment pipeline(s) 1410 (e.g., a reconstruction application, a segmentation application, etc.) with individual containers, each application may execute in a self-contained environment (e.g., at a kernel level) to increase speed and efficiency.

In at least one embodiment, each application and/or container (or image thereof) may be individually developed, modified, and deployed (e.g., a first user or developer may develop, modify, and deploy a first application and a second user or developer may develop, modify, and deploy a second application separate from a first user or developer), which may allow for focus on, and attention to, a task of a single application and/or container(s) without being hindered by tasks of another application(s) or container(s). In at least one embodiment, communication, and cooperation between different containers or applications may be aided by pipeline manager 1412 and application orchestration system 1428. In at least one embodiment, so long as an expected input and/or output of each container or application is known by a system (e.g., based on constructs of applications or containers), application orchestration system 1428 and/or pipeline manager 1412 may facilitate communication among and between, and sharing of resources among and between, each of applications or containers. In at least one embodiment, because one or more of applications or containers in deployment pipeline(s) 1410 may share same services and resources, application orchestration system 1428 may orchestrate, load balance, and determine sharing of services or resources between and among various applications or containers. In at least one embodiment, a scheduler may be used to track resource requirements of applications or containers, current usage or planned usage of these resources, and resource availability. In at least one embodiment, a scheduler may thus allocate resources to different applications and distribute resources between and among applications in view of requirements and availability of a system. In some examples, a scheduler (and/or other component of application orchestration system 1428) may determine resource availability and distribution based on constraints imposed on a system (e.g., user constraints), such as quality of service (QoS), urgency of need for data outputs (e.g., to determine whether to execute real-time processing or delayed processing), etc.

In at least one embodiment, services 1320 leveraged by and shared by applications or containers in deployment system 1306 may include compute service(s) 1416, AI service(s) 1418, visualization service(s) 1420, and/or other service types. In at least one embodiment, applications may call (e.g., execute) one or more of services 1320 to perform processing operations for an application. In at least one embodiment, compute service(s) 1416 may be leveraged by applications to perform super-computing or other high-performance computing (HPC) tasks. In at least one embodiment, compute service(s) 1416 may be leveraged to perform parallel processing (e.g., using a parallel computing platform 1430) for processing data through one or more of applications and/or one or more tasks of a single application, substantially simultaneously. In at least one embodiment, parallel computing platform 1430 (e.g., NVIDIA's CUDA) may enable general purpose computing on GPUs (GPGPU) (e.g., GPUs/Graphics 1422). In at least one embodiment, a software layer of parallel computing platform 1430 may provide access to virtual instruction sets and parallel computational elements of GPUs, for execution of compute kernels. In at least one embodiment, parallel computing platform 1430 may include memory and, in some embodiments, a memory may be shared between and among multiple containers, and/or between and among different processing tasks within a single container. In at least one embodiment, inter-process communication (IPC) calls may be generated for multiple containers and/or for multiple processes within a container to use same data from a shared segment of memory of parallel computing platform 1430 (e.g., where multiple different stages of an application or multiple applications are processing same information). In at least one embodiment, rather than making a copy of data and moving data to different locations in memory (e.g., a read/write operation), same data in same location of a memory may be used for any number of processing tasks (e.g., at a same time, at different times, etc.). In at least one embodiment, as data is used to generate new data as a result of processing, this information of a new location of data may be stored and shared between various applications. In at least one embodiment, location of data and a location of updated or modified data may be part of a definition of how a payload is understood within containers.

In at least one embodiment, AI service(s) 1418 may be leveraged to perform inferencing services for executing machine learning model(s) associated with applications (e.g., tasked with performing one or more processing tasks of an application). In at least one embodiment, AI service(s) 1418 may leverage AI system 1424 to execute machine learning model(s) (e.g., neural networks, such as CNNs) for segmentation, reconstruction, object detection, feature detection, classification, and/or other inferencing tasks. In at least one embodiment, applications of deployment pipeline(s) 1410 may use one or more of output model(s) 1316 from training system 1304 and/or other models of applications to perform inference on imaging data. In at least one embodiment, two or more examples of inferencing using application orchestration system 1428 (e.g., a scheduler) may be available. In at least one embodiment, a first category may include a high priority/low latency path that may achieve higher service level agreements, such as for performing inference on urgent requests during an emergency, or for a radiologist during diagnosis. In at least one embodiment, a second category may include a standard priority path that may be used for requests that may be non-urgent or where analysis may be performed at a later time. In at least one embodiment, application orchestration system 1428 may distribute resources (e.g., services 1320 and/or hardware 1322) based on priority paths for different inferencing tasks of AI service(s) 1418.

In at least one embodiment, shared storage may be mounted to AI service(s) 1418 within system 1400. In at least one embodiment, shared storage may operate as a cache (or other storage device type) and may be used to process inference requests from applications. In at least one embodiment, when an inference request is submitted, a request may be received by a set of API instances of deployment system 1306, and one or more instances may be selected (e.g., for best fit, for load balancing, etc.) to process a request. In at least one embodiment, to process a request, a request may be entered into a database, a machine learning model may be located from model registry 1324 if not already in a cache, a validation step may ensure appropriate machine learning model is loaded into a cache (e.g., shared storage), and/or a copy of a model may be saved to a cache. In at least one embodiment, a scheduler (e.g., of pipeline manager 1412) may be used to launch an application that is referenced in a request if an application is not already running or if there are not enough instances of an application. In at least one embodiment, if an inference server is not already launched to execute a model, an inference server may be launched. Any number of inference servers may be launched per model. In at least one embodiment, in a pull model, in which inference servers are clustered, models may be cached whenever load balancing is advantageous. In at least one embodiment, inference servers may be statically loaded in corresponding, distributed servers.

In at least one embodiment, inferencing may be performed using an inference server that runs in a container. In at least one embodiment, an instance of an inference server may be associated with a model (and optionally a plurality of versions of a model). In at least one embodiment, if an instance of an inference server does not exist when a request to perform inference on a model is received, a new instance may be loaded. In at least one embodiment, when starting an inference server, a model may be passed to an inference server such that a same container may be used to serve different models so long as inference server is running as a different instance.

In at least one embodiment, during application execution, an inference request for a given application may be received, and a container (e.g., hosting an instance of an inference server) may be loaded (if not already), and a start procedure may be called. In at least one embodiment, pre-processing logic in a container may load, decode, and/or perform any additional pre-processing on incoming data (e.g., using a CPU(s) and/or GPU(s)). In at least one embodiment, once data is prepared for inference, a container may perform inference as necessary on data. In at least one embodiment, this may include a single inference call on one image (e.g., a hand X-ray), or may require inference on hundreds of images (e.g., a chest CT). In at least one embodiment, an application may summarize results before completing, which may include, without limitation, a single confidence score, pixel level-segmentation, voxel-level segmentation, generating a visualization, or generating text to summarize findings. In at least one embodiment, different models or applications may be assigned different priorities. For example, some models may have a real-time (TAT<1 min) priority while others may have lower priority (e.g., TAT<10 min). In at least one embodiment, model execution times may be measured from requesting institution or entity and may include partner network traversal time, as well as execution on an inference service.

In at least one embodiment, transfer of requests between services 1320 and inference applications may be hidden behind a software development kit (SDK), and robust transport may be provide through a queue. In at least one embodiment, a request will be placed in a queue via an API for an individual application/tenant ID combination and an SDK will pull a request from a queue and give a request to an application. In at least one embodiment, a name of a queue may be provided in an environment from where an SDK will pick it up. In at least one embodiment, asynchronous communication through a queue may be useful as it may allow any instance of an application to pick up work as it becomes available. Results may be transferred back through a queue, to ensure no data is lost. In at least one embodiment, queues may also provide an ability to segment work, as highest priority work may go to a queue with most instances of an application connected to it, while lowest priority work may go to a queue with a single instance connected to it that processes tasks in an order received. In at least one embodiment, an application may run on a GPU-accelerated instance generated in cloud 1426, and an inference service may perform inferencing on a GPU.

In at least one embodiment, visualization service(s) 1420 may be leveraged to generate visualizations for viewing outputs of applications and/or deployment pipeline(s) 1410. In at least one embodiment, GPUs/Graphics 1422 may be leveraged by visualization service(s) 1420 to generate visualizations. In at least one embodiment, rendering effects, such as ray-tracing, may be implemented by visualization service(s) 1420 to generate higher quality visualizations. In at least one embodiment, visualizations may include, without limitation, 2D image renderings, 3D volume renderings, 3D volume reconstruction, 2D tomographic slices, virtual reality displays, augmented reality displays, etc. In at least one embodiment, virtualized environments may be used to generate a virtual interactive display or environment (e.g., a virtual environment) for interaction by users of a system (e.g., doctors, nurses, radiologists, etc.). In at least one embodiment, visualization service(s) 1420 may include an internal visualizer, cinematics, and/or other rendering or image processing capabilities or functionality (e.g., ray tracing, rasterization, internal optics, etc.).

In at least one embodiment, hardware 1322 may include GPUs/Graphics 1422, AI system 1424, cloud 1426, and/or any other hardware used for executing training system 1304 and/or deployment system 1306. In at least one embodiment, GPUs/Graphics 1422 (e.g., NVIDIA's TESLA and/or QUADRO GPUs) may include any number of GPUs that may be used for executing processing tasks of compute service(s) 1416, AI service(s) 1418, visualization service(s) 1420, other services, and/or any of features or functionality of software 1318. For example, with respect to AI service(s) 1418, GPUs/Graphics 1422 may be used to perform pre-processing on imaging data (or other data types used by machine learning models), post-processing on outputs of machine learning models, and/or to perform inferencing (e.g., to execute machine learning models). In at least one embodiment, cloud 1426, AI system 1424, and/or other components of system 1400 may use GPUs/Graphics 1422. In at least one embodiment, cloud 1426 may include a GPU-optimized platform for deep learning tasks. In at least one embodiment, AI system 1424 may use GPUs, and cloud 1426—or at least a portion tasked with deep learning or inferencing—may be executed using one or more AI systems 1424. As such, although hardware 1322 is illustrated as discrete components, this is not intended to be limiting, and any components of hardware 1322 may be combined with, or leveraged by, any other components of hardware 1322.

In at least one embodiment, AI system 1424 may include a purpose-built computing system (e.g., a super-computer or an HPC) configured for inferencing, deep learning, machine learning, and/or other artificial intelligence tasks. In at least one embodiment, AI system 1424 (e.g., NVIDIA's DGX) may include GPU-optimized software (e.g., a software stack) that may be executed using a plurality of GPUs/ Graphics 1422, in addition to CPUs, RAM, storage, and/or other components, features, or functionality. In at least one embodiment, one or more AI systems 1424 may be implemented in cloud 1426 (e.g., in a data center) for performing some or all of AI-based processing tasks of system 1400.

In at least one embodiment, cloud 1426 may include a GPU-accelerated infrastructure (e.g., NVIDIA's NGC) that may provide a GPU-optimized platform for executing processing tasks of system 1400. In at least one embodiment, cloud 1426 may include an AI system(s) 1424 for performing one or more of AI-based tasks of system 1400 (e.g., as a hardware abstraction and scaling platform). In at least one embodiment, cloud 1426 may integrate with application orchestration system 1428 leveraging multiple GPUs to enable seamless scaling and load balancing between and among applications and services 1320. In at least one embodiment, cloud 1426 may tasked with executing at least some of services 1320 of system 1400, including compute service(s) 1416, AI service(s) 1418, and/or visualization service(s) 1420, as described herein. In at least one embodiment, cloud 1426 may perform small and large batch inference (e.g., executing NVIDIA's TENSOR RT), provide an accelerated parallel computing API and platform 1430 (e.g., NVIDIA's CUDA), execute application orchestration system 1428 (e.g., KUBERNETES), provide a graphics rendering API and platform (e.g., for ray-tracing, 2D graphics, 3D graphics, and/or other rendering techniques to produce higher quality cinematics), and/or may provide other functionality for system 1400.

Figure 15A:
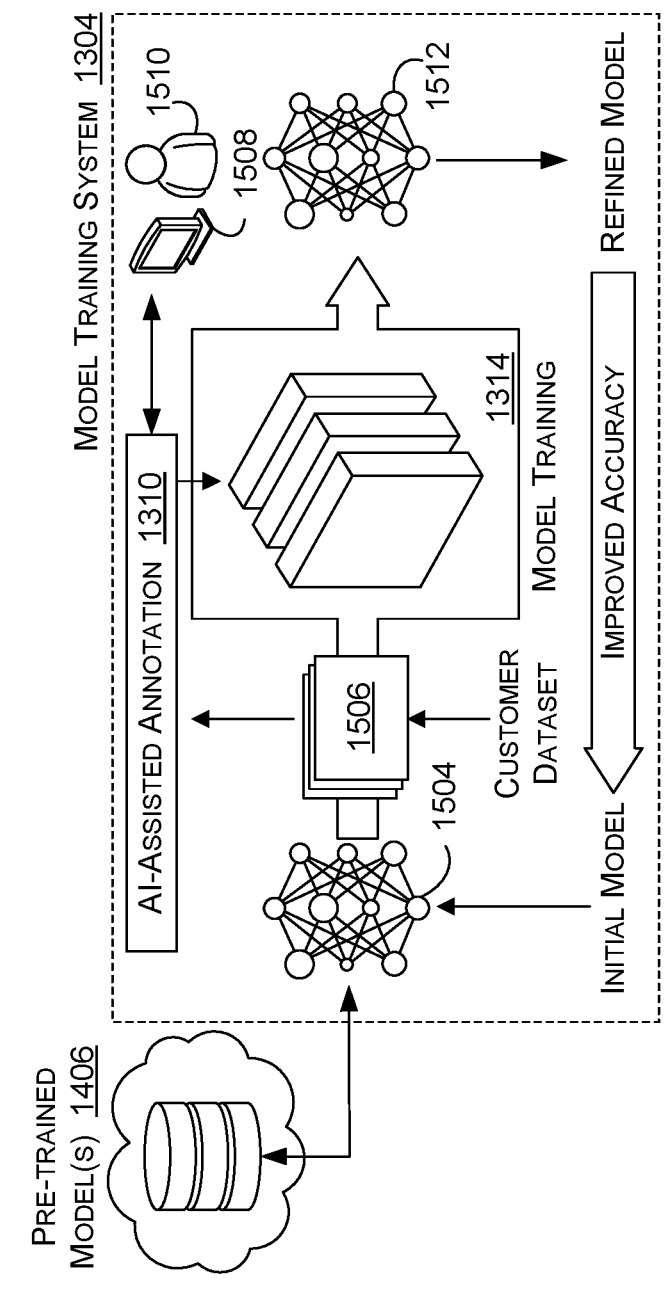
FIGS. 15A and 15B illustrate a data flow diagram for a process to train a machine learning model, as well as client-server architecture to enhance annotation tools with pre-trained annotation models, in accordance with at least one embodiment.

FIG. 15A illustrates a data flow diagram for a process 1500 to train, retrain, or update a machine learning model, in accordance with at least one embodiment. In at least one embodiment, process 1500 may be executed using, as a non-limiting example, system 1400 of FIG. 14. In at least one embodiment, process 1500 may leverage services and/or hardware as described herein. In at least one embodiment, refined models 1512 generated by process 1500 may be executed by a deployment system for one or more containerized applications in deployment pipelines.

In at least one embodiment, model training 1514 may include retraining or updating an initial model 1504 (e.g., a pre-trained model) using new training data (e.g., new input data, such as customer dataset 1506, and/or new ground truth data associated with input data). In at least one embodiment, to retrain, or update, initial model 1504, output or loss layer(s) of initial model 1504 may be reset, or deleted, and/or replaced with an updated or new output or loss layer(s). In at least one embodiment, initial model 1504 may have previously fine-tuned parameters (e.g., weights and/or biases) that remain from prior training, so training or retraining 1514 may not take as long or require as much processing as training a model from scratch. In at least one embodiment, during model training 1514, by having reset or replaced output or loss layer(s) of initial model 1504, parameters may be updated and re-tuned for a new data set based on loss calculations associated with accuracy of output or loss layer(s) at generating predictions on new, customer dataset 1506.

In at least one embodiment, pre-trained models 1506 may be stored in a data store, or registry. In at least one embodiment, pre-trained models 1506 may have been trained, at least in part, at one or more facilities other than a facility executing process 1500. In at least one embodiment, to protect privacy and rights of patients, subjects, or clients of different facilities, pre-trained models 1506 may have been trained, on-premise, using customer or patient data generated on-premise. In at least one embodiment, pre-trained models 1306 may be trained using a cloud and/or other hardware, but confidential, privacy protected patient data may not be transferred to, used by, or accessible to any components of a cloud (or other off premise hardware). In at least one embodiment, where a pre-trained model 1506 is trained at using patient data from more than one facility, pre-trained model 1506 may have been individually trained for each facility prior to being trained on patient or customer data from another facility. In at least one embodiment, such as where a customer or patient data has been released of privacy concerns (e.g., by waiver, for experimental use, etc.), or where a customer or patient data is included in a public data set, a customer or patient data from any number of facilities may be used to train pre-trained model 1506 on-premise and/or off premise, such as in a datacenter or other cloud computing infrastructure.

In at least one embodiment, when selecting applications for use in deployment pipelines, a user may also select machine learning models to be used for specific applications. In at least one embodiment, a user may not have a model for use, so a user may select a pre-trained model to use with an application. In at least one embodiment, pre-trained model may not be optimized for generating accurate results on customer dataset 1506 of a facility of a user (e.g., based on patient diversity, demographics, types of medical imaging devices used, etc.). In at least one embodiment, prior to deploying a pre-trained model into a deployment pipeline for use with an application(s), pre-trained model may be updated, retrained, and/or fine-tuned for use at a respective facility.

In at least one embodiment, a user may select pre-trained model that is to be updated, retrained, and/or fine-tuned, and this pre-trained model may be referred to as initial model 1504 for a training system within process 1500. In at least one embodiment, a customer dataset 1506 (e.g., imaging data, genomics data, sequencing data, or other data types generated by devices at a facility) may be used to perform model training (which may include, without limitation, transfer learning) on initial model 1504 to generate refined model 1512. In at least one embodiment, ground truth data corresponding to customer dataset 1506 may be generated by training system 1304. In at least one embodiment, ground truth data may be generated, at least in part, by clinicians, scientists, doctors, practitioners, at a facility.

In at least one embodiment, AI-assisted annotation may be used in some examples to generate ground truth data. In at least one embodiment, AI-assisted annotation (e.g., implemented using an AI-assisted annotation SDK) may leverage machine learning models (e.g., neural networks) to generate suggested or predicted ground truth data for a customer dataset. In at least one embodiment, a user may use annotation tools within a user interface (a graphical user interface (GUI)) on a computing device.

In at least one embodiment, user 1510 may interact with a GUI via computing device 1508 to edit or fine-tune (auto)annotations. In at least one embodiment, a polygon editing feature may be used to move vertices of a polygon to more accurate or fine-tuned locations.

In at least one embodiment, once customer dataset 1506 has associated ground truth data, ground truth data (e.g., from AI-assisted annotation, manual labeling, etc.) may be used by during model training to generate refined model 1512. In at least one embodiment, customer dataset 1506 may be applied to initial model 1504 any number of times, and ground truth data may be used to update parameters of initial model 1504 until an acceptable level of accuracy is attained for refined model 1512. In at least one embodiment, once refined model 1512 is generated, refined model 1512 may be deployed within one or more deployment pipelines at a facility for performing one or more processing tasks with respect to medical imaging data.

In at least one embodiment, refined model 1512 may be uploaded to pre-trained models in a model registry to be selected by another facility. In at least one embodiment, this process may be completed at any number of facilities such that refined model 1512 may be further refined on new datasets any number of times to generate a more universal model.

Figure 15B:
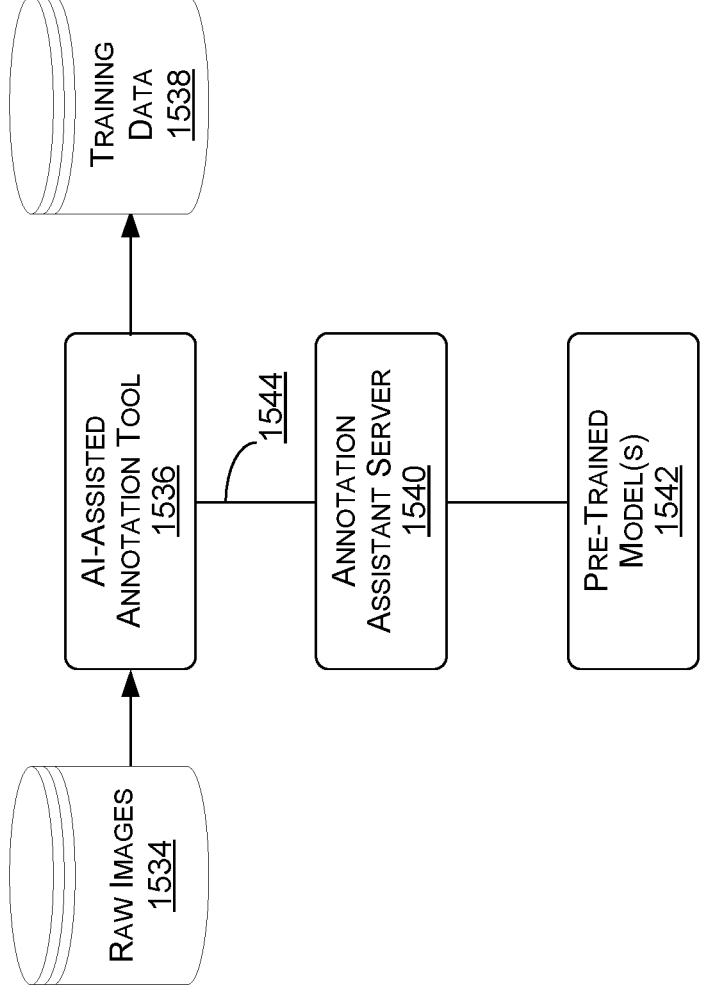
Figure 15B:

FIG. 15B is an example illustration of a client-server architecture 1532 to enhance annotation tools with pre-trained annotation models, in accordance with at least one embodiment. In at least one embodiment, AI-assisted annotation tool 1536 may be instantiated based on a client-server architecture 1532. In at least one embodiment, AI-assisted annotation tool 1536 in imaging applications may aid radiologists, for example, identify organs and abnormalities. In at least one embodiment, imaging applications may include software tools that help user 1510 to identify, as a non-limiting example, a few extreme points on a particular organ of interest in raw images 1534 (e.g., in a 3D MM or CT scan) and receive auto-annotated results for all 2D slices of a particular organ. In at least one embodiment, results may be stored in a data store as training data 1538 and used as (for example and without limitation) ground truth data for training. In at least one embodiment, when computing device 1508 sends extreme points for AI-assisted annotation, a deep learning model, for example, may receive this data as input and return inference results of a segmented organ or abnormality. In at least one embodiment, pre-instantiated annotation tools, such as AI-assisted annotation tool 1536 in FIG. 15B, may be enhanced by making API calls (e.g., API Call 1544) to a server, such as an Annotation Assistant Server 1540 that may include a set of pre-trained model(s) 1542 stored in an annotation model registry, for example. In at least one embodiment, an annotation model registry may store pre-trained model(s) 1542 (e.g., machine learning models, such as deep learning models) that are pre-trained to perform AI-assisted annotation on a particular organ or abnormality. These models may be further updated by using training pipelines. In at least one embodiment, pre-installed annotation tools may be improved over time as new labeled data is added.

Various embodiments can be described by the following clauses:

1. A computer-implemented method, comprising:
    obtaining a first sequence of points representative of a first shape of a first object;
    generating, based in part on at least a first subset of the first sequence of points, a first invertible transform for the first object;
    generating, using the first invertible transform, a first canonical form of the first object;
    obtaining a second sequence of points representative of a second shape of a second object;
    generating, based in part on at least a second subset of the second sequence of points, a second invertible transform for a second object;
    generating, using the second invertible transform, a second canonical form of the second object; and
    determining, based in part upon comparing the first canonical form and the second canonical form, that the second object is a duplicate of the first object.

2. The computer-implemented method of clause 1, further comprising:
    determining a first vector between a selected origin point and a first point in the first sub set;
    determining a second vector, linearly independent from the first vector, between the selected origin point and a second point in the first subset;
    determining a third vector, linearly independent from the first vector and the second vector, between the selected origin point and a third point in the first subset.

3. The computer-implemented method of clause 2, wherein the first vector is perpendicular to the second vector.

4. The computer-implemented method of clause 3, wherein the first point is selected to provide a longest differential vector from the selected origin point.

5. The computer-implemented method of clause 2, wherein at least one of the selected origin point, the first point, the second point, or the third point are pseudo-randomly selected.

6. The computer-implemented method of clause 1, further comprising:
    determining a first hash for the first object based, at least in part, on the first object topology;
    determining a second hash for the second object based, at least in part, on the second object topology; and
    placing the second object in a common bucket with the first object based on the first hash and the second hash.

7. The computer-implemented method of clause 1, further comprising:
    determining the first object is imported from a source that applied a point-level transform to the first object.

8. The computer-implemented method of clause 1, further comprising:
    deleting the second object; and
    copying the first object to provide a representation of the second object.

9. A processor, comprising:
    one or more circuits to:
        determine a first hash value for a first object based at least on a first object topology;
        determine a linearly independent set of vectors for the first object;
        determine a second hash value for a second object based at least on a second object topology is within a threshold similarity to the first hash value;
        compare, using a transform associated with the linearly set of vectors, the first object and the second object; and
        determine the first object and the second object are duplicates.

10. The processor of clause 9, wherein the one or more circuits are further to:
    determine, from a sequence of points corresponding to the first object, a first set of points for the set of vectors.

11. The processor of clause 9, wherein the set of vectors extend from a common origin point.

12. The processor of clause 9, wherein values for respective angles between the vectors of the set of vectors exceed a threshold.

13. The processor of clause 12, wherein the values are equal to 90 degrees.

14. The processor of clause 13, wherein respective lengths of the set of vectors are normalized to form a rigid transform.

15. The processor of clause 9, wherein the first object and the second object are represented by at least one of a triangular mesh, a polygonal mesh, a non-uniform rational B-spline, Bezier patches, or subdivision surfaces.

16. The processor of clause 9, wherein the processor is comprised in at least one of:
  a system for performing simulation operations;
  a system for performing simulation operations to test or validate autonomous machine applications;
  a system for performing digital twin operations;
  a system for performing light transport simulation;
  a system for rendering graphical output;
  a system for performing deep learning operations;
  a system implemented using an edge device;
  a system for generating or presenting virtual reality (VR) content;
  a system for generating or presenting augmented reality (AR) content;
  a system for generating or presenting mixed reality (MR) content;
  a system incorporating one or more Virtual Machines (VMs);
  a system for performing operations for a conversational AI application;
  a system for performing operations for a generative AI application;
  a system for performing operations using a language model;
  a system for performing one or more generative content operations using a large language model (LLM);
  a system implemented at least partially in a data center;
  a system for performing hardware testing using simulation;
  a system for performing one or more generative content operations using a language model;
  a system for synthetic data generation;
  a collaborative content creation platform for 3D assets; or
  a system implemented at least partially using cloud computing resources.

17. A system, comprising:
  one or more processors to determine a similarity between a first object and a second object based at least on mapping a second canonical form of the second object to a first canonical from of the first object, the respective canonical forms determined by an ordered tuple of points forming at least three linearly independent vectors.

18. The system of clause 17, wherein the at least three linearly independent vectors extend from a common origin point.

19. The system of clause 17, wherein the second canonical form and the first canonical form are associated with a transform for the first object and the second object, respectively.

20. The system of clause 17, wherein the ordered tuple includes at least four points that are pseudo randomly selected.

21. The system of clause 17, wherein the one or more processors are further to delete the second object when the second object is sufficiently similar to the first object.

22. The system of clause 17, wherein the system is one of:
  a system for performing simulation operations;
  a system for performing simulation operations to test or validate autonomous machine applications;
  a system for performing digital twin operations;
  a system for performing light transport simulation;
  a system for rendering graphical output;
  a system for performing deep learning operations;
  a system implemented using an edge device;
  a system for generating or presenting virtual reality (VR) content;
  a system for generating or presenting augmented reality (AR) content;
  a system for generating or presenting mixed reality (MR) content;
  a system incorporating one or more Virtual Machines (VMs);
  a system for performing operations for a conversational AI application;
  a system for performing operations for a generative AI application;
  a system for performing operations using a language model;
  a system for performing one or more generative content operations using a large language model (LLM);
  a system implemented at least partially in a data center;
  a system for performing hardware testing using simulation;
  a system for performing one or more generative content operations using a language model;
  a system for synthetic data generation;
  a collaborative content creation platform for 3D assets; or
  a system implemented at least partially using cloud computing resources.

Other variations are within spirit of present disclosure. Thus, while disclosed techniques are susceptible to various modifications and alternative constructions, certain illustrated embodiments thereof are shown in drawings and have been described above in detail. It should be understood, however, that there is no intention to limit disclosure to specific form or forms disclosed, but on contrary, intention is to cover all modifications, alternative constructions, and equivalents falling within spirit and scope of disclosure, as defined in appended claims.

Use of terms "a" and "an" and "the" and similar referents in context of describing disclosed embodiments (especially in context of following claims) are to be construed to cover both singular and plural, unless otherwise indicated herein or clearly contradicted by context, and not as a definition of a term. Terms "comprising," "having," "including," and "containing" are to be construed as open-ended terms (meaning "including, but not limited to,") unless otherwise noted. Term "connected," when unmodified and referring to physical connections, is to be construed as partly or wholly contained within, attached to, or joined together, even if there is something intervening. Recitation of ranges of values herein are merely intended to serve as a shorthand method of referring individually to each separate value falling within range, unless otherwise indicated herein and each separate value is incorporated into specification as if it were individually recited herein. Use of term "set" (e.g., "a set of items") or "subset," unless otherwise noted or contradicted by context, is to be construed as a nonempty collection comprising one or more members. Further, unless otherwise noted or contradicted by context, term "subset" of a corresponding set does not necessarily denote a proper subset of corresponding set, but subset and corresponding set may be equal.

Conjunctive language, such as phrases of form "at least one of A, B, and C," or "at least one of A, B and C," unless specifically stated otherwise or otherwise clearly contradicted by context, is otherwise understood with context as used in general to present that an item, term, etc., may be either A or B or C, or any nonempty subset of set of A and B and C. For instance, in illustrative example of a set having three members, conjunctive phrases "at least one of A, B, and C" and "at least one of A, B and C" refer to any of following sets: {A}, {B}, {C}, {A, B}, {A, C}, {B, C}, {A, B, C}. Thus, such conjunctive language is not generally intended to imply that certain embodiments require at least one of A, at least one of B, and at least one of C each to be present. In addition, unless otherwise noted or contradicted by context, term "plurality" indicates a state of being plural (e.g., "a plurality of items" indicates multiple items). A plurality is at least two items, but can be more when so indicated either explicitly or by context. Further, unless stated otherwise or otherwise clear from context, phrase "based on" means "based at least in part on" and not "based solely on."

Operations of processes described herein can be performed in any suitable order unless otherwise indicated herein or otherwise clearly contradicted by context. In at least one embodiment, a process such as those processes described herein (or variations and/or combinations thereof) is performed under control of one or more computer systems configured with executable instructions and is implemented as code (e.g., executable instructions, one or more computer programs or one or more applications) executing collectively on one or more processors, by hardware or combinations thereof. In at least one embodiment, code is stored on a computer-readable storage medium, for example, in form of a computer program comprising a plurality of instructions executable by one or more processors. In at least one embodiment, a computer-readable storage medium is a non-transitory computer-readable storage medium that excludes transitory signals (e.g., a propagating transient electric or electromagnetic transmission) but includes non-transitory data storage circuitry (e.g., buffers, cache, and queues) within transceivers of transitory signals. In at least one embodiment, code (e.g., executable code or source code) is stored on a set of one or more non-transitory computer-readable storage media having stored thereon executable instructions (or other memory to store executable instructions) that, when executed (i.e., as a result of being executed) by one or more processors of a computer system, cause computer system to perform operations described herein. A set of non-transitory computer-readable storage media, in at least one embodiment, comprises multiple non-transitory computer-readable storage media and one or more of individual non-transitory storage media of multiple non-transitory computer-readable storage media lack all of code while multiple non-transitory computer-readable storage media collectively store all of code. In at least one embodiment, executable instructions are executed such that different instructions are executed by different processors— for example, a non-transitory computer-readable storage medium store instructions and a main central processing unit ("CPU") executes some of instructions while a graphics processing unit ("GPU") executes other instructions. In at least one embodiment, different components of a computer system have separate processors and different processors execute different subsets of instructions.

Accordingly, in at least one embodiment, computer systems are configured to implement one or more services that singly or collectively perform operations of processes described herein and such computer systems are configured with applicable hardware and/or software that enable performance of operations. Further, a computer system that implements at least one embodiment of present disclosure is a single device and, in another embodiment, is a distributed computer system comprising multiple devices that operate differently such that distributed computer system performs operations described herein and such that a single device does not perform all operations.

Use of any and all examples, or exemplary language (e.g., "such as") provided herein, is intended merely to better illuminate embodiments of disclosure and does not pose a limitation on scope of disclosure unless otherwise claimed. No language in specification should be construed as indicating any non-claimed element as essential to practice of disclosure.

All references, including publications, patent applications, and patents, cited herein are hereby incorporated by reference to same extent as if each reference were individually and specifically indicated to be incorporated by reference and were set forth in its entirety herein.

In description and claims, terms "coupled" and "connected," along with their derivatives, may be used. It should be understood that these terms may be not intended as synonyms for each other. Rather, in particular examples, "connected" or "coupled" may be used to indicate that two or more elements are in direct or indirect physical or electrical contact with each other. "Coupled" may also mean that two or more elements are not in direct contact with each other, but yet still co-operate or interact with each other.

Unless specifically stated otherwise, it may be appreciated that throughout specification terms such as "processing," "computing," "calculating," "determining," or like, refer to action and/or processes of a computer or computing system, or similar electronic computing device, that manipulate and/or transform data represented as physical, such as electronic, quantities within computing system's registers and/or memories into other data similarly represented as physical quantities within computing system's memories, registers or other such information storage, transmission or display devices.

In a similar manner, term "processor" may refer to any device or portion of a device that processes electronic data from registers and/or memory and transform that electronic data into other electronic data that may be stored in registers and/or memory. As non-limiting examples, "processor" may be a CPU or a GPU. A "computing platform" may comprise one or more processors. As used herein, "software" processes may include, for example, software and/or hardware entities that perform work over time, such as tasks, threads, and intelligent agents. Also, each process may refer to multiple processes, for carrying out instructions in sequence or in parallel, continuously or intermittently. Terms "system" and "method" are used herein interchangeably insofar as system may embody one or more methods and methods may be considered a system.

In present document, references may be made to obtaining, acquiring, receiving, or inputting analog or digital data into a subsystem, computer system, or computer-implemented machine. Obtaining, acquiring, receiving, or inputting analog and digital data can be accomplished in a variety of ways such as by receiving data as a parameter of a function call or a call to an application programming interface. In some implementations, process of obtaining, acquiring, receiving, or inputting analog or digital data can be accomplished by transferring data via a serial or parallel interface. In another implementation, process of obtaining, acquiring, receiving, or inputting analog or digital data can be accomplished by transferring data via a computer network from providing entity to acquiring entity. References may also be made to providing, outputting, transmitting, sending, or presenting analog or digital data. In various examples, process of providing, outputting, transmitting, sending, or presenting analog or digital data can be accomplished by transferring data as an input or output parameter of a function call, a parameter of an application programming interface or interprocess communication mechanism.

Although discussion above sets forth example implementations of described techniques, other architectures may be used to implement described functionality, and are intended to be within scope of this disclosure. Furthermore, although specific distributions of responsibilities are defined above for purposes of discussion, various functions and responsibilities might be distributed and divided in different ways, depending on circumstances.

Furthermore, although subject matter has been described in language specific to structural features and/or methodological acts, it is to be understood that subject matter claimed in appended claims is not necessarily limited to specific features or acts described. Rather, specific features and acts are disclosed as exemplary forms of implementing the claims.

What is claimed is:

1. A computer-implemented method, comprising:
generating a first invertible transform for a first object based in part on at least a first sequence of points representative of a first shape of the first object;
generating, using the first invertible transform, a first canonical form of the first object;
generating a second invertible transform for a second object based in part on at least a second sequence of points representative of a second shape of the second object;
generating, using the second invertible transform, a second canonical form of the second object;
determining, based in part upon comparing the first canonical form and the second canonical form, that the second object is a duplicate of the first object;
deleting the second object from a storage location associated with a scene representation including the first shape and the second shape; and
rendering the scene representation, the first shape being rendered in a first position based, at least in part, on a first applied transform and the second shape being rendered in a second position based, at least in part, on a second applied transform.

2. The computer-implemented method of claim 1, further comprising:
determining a first vector between a selected origin point and a first point in the first sequence of points;
determining a second vector, linearly independent from the first vector, between the selected origin point and a second point in the first sequence of points; and
determining a third vector, linearly independent from the first vector and the second vector, between the selected origin point and a third point in the first sequence of points.

3. The computer-implemented method of claim 2, wherein the first vector is perpendicular to the second vector.

4. The computer-implemented method of claim 3, wherein the first point is selected to provide a longest differential vector from the selected origin point.

5. The computer-implemented method of claim 2, wherein at least one of the selected origin point, the first point, the second point, or the third point are pseudo-randomly selected.

6. The computer-implemented method of claim 1, further comprising:
determining a first hash for the first object based, at least in part, on a first object topology;
determining a second hash for the second object based, at least in part, on a second object topology; and
placing the second object in a common bucket with the first object based on the first hash and the second hash.

7. The computer-implemented method of claim 1, further comprising:
determining the first object is imported from a source that applied a point-level transform to the first object.

8. The computer-implemented method of claim 1, further comprising:
using the first object to provide a representation of the second object.

9. A processor, comprising:
one or more circuits to:
determine a first hash value for a first object based at least on a first object topology associated with first connectivity data for a first set of points of the first object;
determine a linearly independent set of vectors for the first object;
determine a second hash value for a second object based at least on a second object topology, associated with second connectivity data for a second set of points of the second object, is within a threshold value to the first hash value;
compare, using a transform associated with the linearly independent set of vectors, the first object and the second object;
determine the first object and the second object are duplicates;
remove the second object from a file associated with representation of a scene including the first object and the second object; and
render each of the first object and the second object, within the scene, using the first object.

10. The processor of claim 9, wherein the one or more circuits are further to:
determine, from a sequence of points corresponding to the first object, a first set of points for the set of vectors.

11. The processor of claim 9, wherein the set of vectors extend from a common origin point.

12. The processor of claim 9, wherein values for respective angles between the vectors of the set of vectors exceed a threshold.

13. The processor of claim 12, wherein the values are equal to 90 degrees.

14. The processor of claim 13, wherein respective lengths of the set of vectors are normalized to form a rigid transform.

15. The processor of claim 9, wherein the first object and the second object are represented by at least one of a triangular mesh, a polygonal mesh, a non-uniform rational B-spline, Bezier patches, or subdivision surfaces.

16. The processor of claim 9, wherein the processor is comprised in at least one of:
a system for performing simulation operations;

a system for performing simulation operations to test or validate autonomous machine applications;

a system for performing digital twin operations;

a system for performing light transport simulation;

a system for rendering graphical output;

a system for performing deep learning operations;

a system implemented using an edge device;

a system for generating or presenting virtual reality (VR) content;

a system for generating or presenting augmented reality (AR) content;

a system for generating or presenting mixed reality (MR) content;

a system incorporating one or more Virtual Machines (VMs);

a system for performing operations for a conversational AI application;

a system for performing operations for a generative AI application;

a system for performing operations using a language model;

a system for performing one or more generative content operations using a large language model (LLM);

a system implemented at least partially in a data center;

a system for performing hardware testing using simulation;

a system for performing one or more generative content operations using a language model;

a system for synthetic data generation;

a collaborative content creation platform for 3D assets; or a system implemented at least partially using cloud computing resources.

17. A system, comprising:

one or more processors to determine duplicates between a first object and a second object based at least on mapping a second canonical form of the second object to a first canonical form of the first object, the respective canonical forms determined by an ordered tuple of points forming at least three linearly independent vectors, to delete the second object, from a file corresponding to a scene including the first object and the second object, upon determining the second object is a duplicate of the first object, and to render each of the first object and the second object using the first object.

18. The system of claim 17, wherein the at least three linearly independent vectors extend from a common origin point.

19. The system of claim 17, wherein the second canonical form and the first canonical form are associated with a transform for the first object and the second object, respectively.

20. The system of claim 17, wherein the ordered tuple includes at least four points that are pseudo randomly selected.

21. The system of claim 17, wherein the first object and the second object are represented by at least one of a triangular mesh, a polygonal mesh, a non-uniform rational B-spline, Bezier patches, or subdivision surfaces.

22. The system of claim 17, wherein the system is one of:

a system for performing simulation operations;

a system for performing simulation operations to test or validate autonomous machine applications;

a system for performing digital twin operations;

a system for performing light transport simulation;

a system for rendering graphical output;

a system for performing deep learning operations;

a system implemented using an edge device;

a system for generating or presenting virtual reality (VR) content;

a system for generating or presenting augmented reality (AR) content;

a system for generating or presenting mixed reality (MR) content;

a system incorporating one or more Virtual Machines (VMs);

a system for performing operations for a conversational AI application;

a system for performing operations for a generative AI application;

a system for performing operations using a language model;

a system for performing one or more generative content operations using a large language model (LLM);

a system implemented at least partially in a data center;

a system for performing hardware testing using simulation;

a system for performing one or more generative content operations using a language model;

a system for synthetic data generation;

a collaborative content creation platform for 3D assets; or a system implemented at least partially using cloud computing resources.

* * * * *